United States Patent
Sawanishi et al.

(10) Patent No.: US 11,911,837 B2
(45) Date of Patent: Feb. 27, 2024

(54) RESISTANCE SPOT WELDING METHOD AND WELD MEMBER PRODUCTION METHOD

(71) Applicant: JFE STEEL CORPORATION, Tokyo (JP)

(72) Inventors: Chikaumi Sawanishi, Tokyo (JP); Hiroshi Matsuda, Tokyo (JP); Rinsei Ikeda, Tokyo (JP)

(73) Assignee: JFE STEEL CORPORATION, Tokyo (JP)

(*) Notice: Subject to any disclaimer, the term of this patent is extended or adjusted under 35 U.S.C. 154(b) by 862 days.

(21) Appl. No.: 16/969,976

(22) PCT Filed: Feb. 18, 2019

(86) PCT No.: PCT/JP2019/005875
§ 371 (c)(1),
(2) Date: Aug. 14, 2020

(87) PCT Pub. No.: WO2019/160141
PCT Pub. Date: Aug. 22, 2019

(65) Prior Publication Data
US 2020/0398368 A1 Dec. 24, 2020

(30) Foreign Application Priority Data
Feb. 19, 2018 (JP) ................. 2018-027385

(51) Int. Cl.
B23K 11/11 (2006.01)
B23K 11/25 (2006.01)

(52) U.S. Cl.
CPC ........... B23K 11/115 (2013.01); B23K 11/257 (2013.01)

(58) Field of Classification Search
CPC ....... B23K 11/10; B23K 11/11; B23K 11/115; B23K 11/24; B23K 11/25; B23K 11/253; B23K 11/255; B23K 11/257
See application file for complete search history.

(56) References Cited

U.S. PATENT DOCUMENTS 6,057,523 A   5/2000  Fujii et al.
6,130,396 A  10/2000  Hasegawa et al.
(Continued)

FOREIGN PATENT DOCUMENTS

CN   104070278 A  10/2014
CN   104661784 A   5/2015
(Continued)

OTHER PUBLICATIONS

Jul. 5, 2021, Office Action issued by the China National Intellectual Property Administration in the corresponding Chinese Patent Application No. 201980013789.5 with English language search report.

(Continued)

Primary Examiner — Brian W Jennison
(74) Attorney, Agent, or Firm — KENJA IP LAW PC

(57) ABSTRACT

A resistance spot welding method comprises: performing test welding; and performing actual welding after the test welding, wherein the test welding is performed under each of two or more welding conditions. In the test welding, for each of the welding conditions, an electrode force parameter from when electrode force application to parts to be welded starts to when a set electrode force is reached before start of current passage and a time variation curve of an instantaneous amount of heat generated and a cumulative amount of heat generated are stored. In the actual welding: electrode force application to the parts to be welded is performed under each of the same conditions as in the test welding before start of current passage, and a corresponding electrode force parameter and the parameter stored in the test welding are compared for each of the welding conditions to set a target of a time variation curve of an instantaneous amount of heat generated and a cumulative amount of heat generated in the actual welding; and adaptive control welding is performed to control a current passage amount according to the target.

11 Claims, 8 Drawing Sheets

(56) References Cited

U.S. PATENT DOCUMENTS

| | | | |
|---|---|---|---|
| 9,440,306 B2 | 9/2016 | Amagata | |
| 9,821,404 B2 | 11/2017 | Sawanishi et al. | |
| 9,895,764 B2 | 2/2018 | Okita et al. | |
| 10,040,145 B2 | 8/2018 | Furusako et al. | |
| 10,081,074 B2 | 9/2018 | Sawanishi et al. | |
| 10,328,518 B2 | 6/2019 | Okita et al. | |
| 10,641,304 B2 | 5/2020 | Taniguchi et al. | |
| 2004/0007562 A1 | 1/2004 | Kitahori et al. | |
| 2013/0248505 A1* | 9/2013 | Anayama | B23K 11/115 219/130.01 |
| 2016/0008913 A1* | 1/2016 | Okita | B23K 11/115 219/86.7 |
| 2016/0008914 A1* | 1/2016 | Okita | B23K 11/255 219/78.01 |
| 2016/0236294 A1* | 8/2016 | Sawanishi | B23K 11/115 |

FOREIGN PATENT DOCUMENTS

| | | |
|---|---|---|
| CN | 105073326 A | 11/2015 |
| CN | 107427953 A | 12/2017 |
| DE | 102008028385 A1 | 12/2009 |
| JP | H09216071 A | 8/1997 |
| JP | H1094883 A | 4/1998 |
| JP | H1133743 A | 2/1999 |
| JP | 2003236674 A | 8/2003 |
| JP | 2004106057 A | 4/2004 |
| JP | 2006043731 A | 2/2006 |
| WO | 2014136507 A1 | 9/2014 |
| WO | 2015049998 A1 | 4/2015 |
| WO | 2015099192 A1 | 7/2015 |
| WO | 2015190082 A1 | 12/2015 |

OTHER PUBLICATIONS

Apr. 16, 2019, International Search Report issued in the International Patent Application No. PCT/JP2019/005875.

Jun. 1, 2021, the Extended European Search Report issued by the European Patent Office in the corresponding European Patent Application No. 19754350.7.

* cited by examiner

FIG. 7
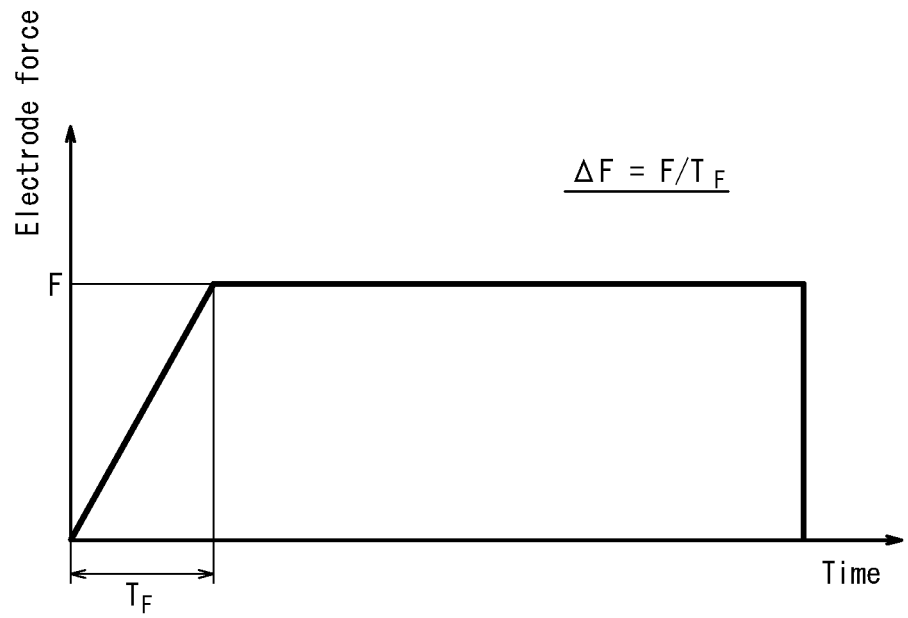
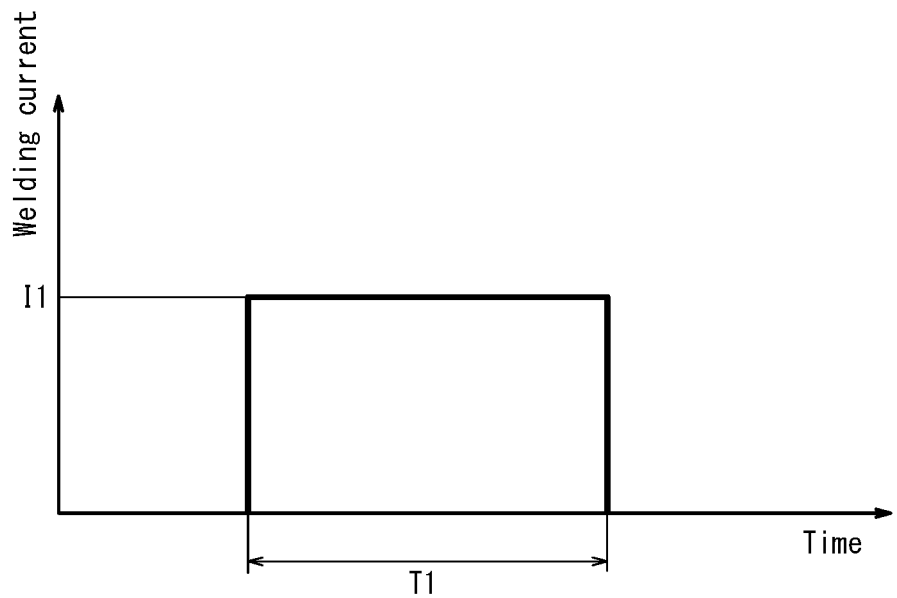

FIG. 8
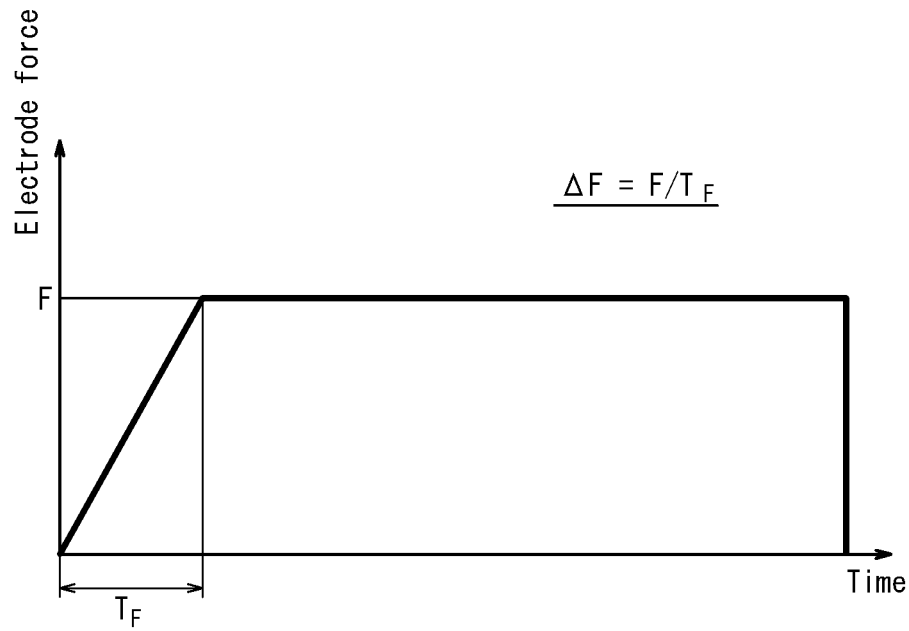
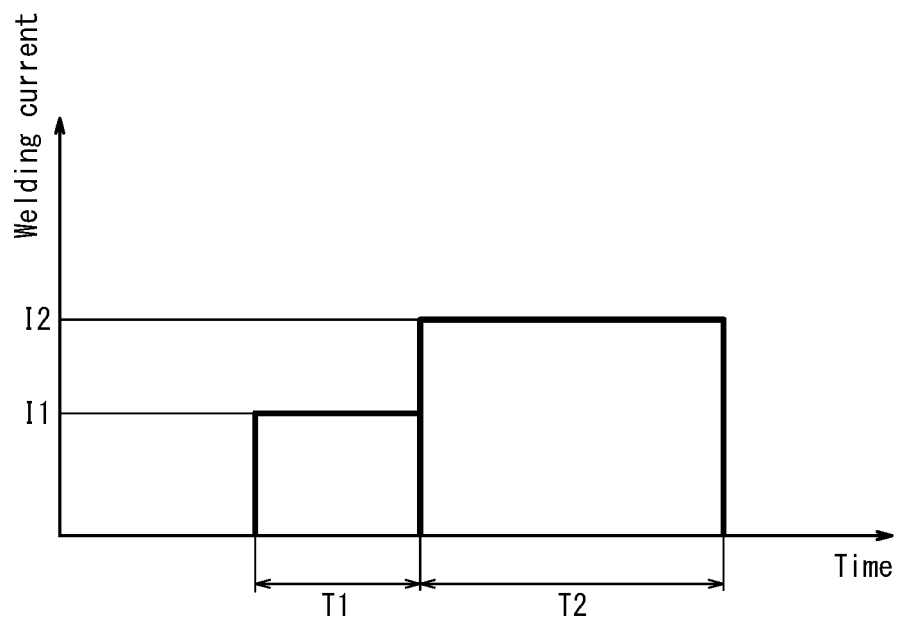

RESISTANCE SPOT WELDING METHOD AND WELD MEMBER PRODUCTION METHOD

TECHNICAL FIELD

The present disclosure relates to a resistance spot welding method. The present disclosure is particularly intended to ensure a stable nugget diameter without expulsion (splash) even in the case where the effect of a disturbance such as current shunting or a sheet gap is significant.

BACKGROUND

Overlapping steel sheets are typically joined by resistance spot welding which is one type of lap resistance welding.

Resistance spot welding is a method of squeezing two or more overlapping steel sheets by a pair of electrodes from above and below and, while applying an electrode force, passing a high welding current between the upper and lower electrodes for a short time to join the steel sheets. Heat generated from the resistance to the flow of the high welding current is used to obtain a spot weld. The spot weld is called a nugget, and results from the overlapping steel sheets melting and solidifying at their contact portion when the current flows through the steel sheets. The steel sheets are spot-joined by this nugget.

For good weld quality, it is important to form the nugget with a diameter in an appropriate range. The nugget diameter depends on the welding condition such as welding current, welding time, electrode shape, and electrode force. To achieve an appropriate nugget diameter, the welding condition needs to be set appropriately according to the parts-to-be-welded condition such as the material, sheet thickness, and number of overlapping sheets of the parts to be welded.

In vehicle manufacturing, for example, spot welding is performed at several thousand points per vehicle, and parts to be welded (workpieces) conveyed one after another need to be welded. If the state of the parts to be welded such as the material, sheet thickness, and number of overlapping sheets of the parts to be welded is the same at each welding location, the same welding condition such as welding current, welding time, and electrode force can be used to obtain the same nugget diameter. In continuous welding, however, the contact surfaces of the electrodes with the parts to be welded wear gradually and the contact areas widen gradually as compared with the initial state. When the same welding current as in the initial state is passed in such a state in which the contact areas have widened, the current density in the parts to be welded decreases and the temperature rise of the weld decreases, resulting in a decrease in nugget diameter. Accordingly, the electrodes are dressed or replaced every several hundred to several thousand welding points, to prevent the electrode tip diameter from increasing excessively.

A resistance welding device having a function (stepper function) of increasing the welding current after a predetermined number of welding operations to compensate for a decrease in current density associated with electrode wear has been conventionally used, too. To use the stepper function, the above-mentioned welding current change pattern needs to be set appropriately beforehand. However, considerable time and cost are required to derive the welding current change patterns corresponding to numerous welding conditions and parts-to-be-welded conditions through tests and the like. Besides, since the state of progress of electrode wear varies in actual work, the welding current change pattern set beforehand may not always be appropriate.

In addition, in the case where there is a disturbance during welding, such as when a point that has already been welded (existing weld) is present near the current welding point or when the parts to be welded have considerable surface roughness and a contact point of the parts to be welded is present near the welding point, part of the current is shunted into such an existing weld or contact point during welding. In this state, even when welding is performed under a predetermined condition, the current density at the position to be welded which is directly above and below the electrodes decreases, and so a nugget of a required diameter cannot be obtained. To compensate for such an insufficient amount of heat generated and obtain a nugget of a required diameter, a high welding current needs to be set beforehand.

Moreover, in the case where the surroundings of the welding point are strongly restrained due to surface roughness, member shape, etc. or in the case where foreign matter is present between the steel sheets around the welding point, a larger sheet gap between the steel sheets causes a smaller contact diameter of the steel sheets, which may facilitate expulsion.

The following techniques have been proposed to solve the problems stated above.

For example, JP 2003-236674 A (PTL 1) discloses a spot welding method for high tensile strength steel sheets whereby spot welding is performed through the following steps to suppress expulsion caused by poor fitness in an initial stage of current passage: a first step of gradually increasing the current to high tensile strength steel sheets to form a nugget; a second step of decreasing the current after the first step; and a third step of, after the second step, increasing the current to perform actual welding and gradually decreasing the current.

JP 2006-43731 A (PTL 2) discloses a current control method in spot welding whereby such a current that can suppress spattering is maintained for a predetermined time in an initial part of welding time to soften the surfaces of parts to be welded and then a high current is maintained for a predetermined time to grow a nugget while suppressing spattering.

JP H9-216071 A (PTL 3) discloses a control unit of a resistance welder that compares an estimated temperature distribution of a weld and a target nugget and controls the output of the welder to obtain the set nugget diameter.

JP H10-94883 A (PTL 4) discloses a welding condition control method for a resistance welder of detecting the welding current and the voltage between tips, simulating a weld through heat transfer calculation, and estimating the nugget formation state in the weld during welding to achieve good welding.

JP H11-33743 A (PTL 5) discloses a resistance welding system that calculates, from the sheet thickness of parts to be welded and the welding time, the cumulative amount of heat generated per unit volume with which good welding of the parts to be welded is possible, and adjusts the welding current or voltage to generate the calculated amount of heat per unit volume and per unit time, to achieve good welding regardless of the type of the parts to be welded or the wear state of the electrodes.

CITATION LIST

Patent Literatures

PTL 1: JP 2003-236674 A
PTL 2: JP 2006-43731 A

PTL 3: JP H9-216071 A
PTL 4: JP H10-94883 A
PTL 5: JP H11-33743 A
PTL 6: WO 2014/136507 A1

SUMMARY

Technical Problem

However, with the techniques described in PTL 1 and PTL 2, given that an appropriate welding condition is likely to vary depending on the presence or absence of a disturbance and the magnitude of the disturbance, a desired nugget diameter cannot be ensured without expulsion when a larger sheet gap or current shunting than expected occurs.

The techniques described in PTL 3 and PTL 4 need complex calculation to estimate the nugget temperature based on a heat transfer model (heat transfer simulation) and the like. This requires a welding control unit that is not only complex in structure but also expensive.

The technique described in PTL 5 enables good welding even with certain electrode wear, by adjusting the cumulative amount of heat generated to the target. However, in the case where the set parts-to-be-welded condition and the actual parts-to-be-welded condition are significantly different, such as when a disturbance such as the above-mentioned existing weld is present nearby, or in the case where the time variation pattern of the amount of heat generated changes greatly in a short period of time, such as when welding hot-dip galvanized steel sheets having a large coating amount, adaptive control cannot keep up. Even when the final cumulative amount of heat generated can be adjusted to the target, the heat generation pattern, namely, the time variation of the temperature distribution of the weld, deviates from the target heat pattern for obtaining a good weld. This hinders the obtainment of a required nugget diameter, or causes expulsion.

For example, an attempt to adjust the cumulative amount of heat generated to the target in the case where the effect of current shunting is significant causes marked heat generation not between the steel sheets but between the electrodes and the steel sheets, and facilitates expulsion from the steel sheet surfaces.

Further, while the techniques described in PTL 3 to PTL 5 are all effective to some extent for the change in the case where the electrode tips wear, these techniques do not take into consideration the situations where the effect of current shunting is significant because of, for example, the presence of an existing weld nearby. Hence, adaptive control does not actually function in some cases.

In view of this, we previously developed the following method and disclosed it in WO 2014/136507 A1 (PTL 6): "A method of resistance spot welding to join parts to be welded by squeezing the parts between a pair of electrodes and passing a current while applying an electrode force, the parts being a plurality of overlapping metal sheets, the method comprising: dividing a current pattern into two or more steps for welding; before actual welding, performing test welding to store, for each step as a target, a time variation of an instantaneous amount of heat generated per unit volume and a cumulative amount of heat generated per unit volume that are calculated from an electrical property between the electrodes when forming an appropriate nugget by passing a current with constant current control; and subsequently, as actual welding, starting welding using, as a standard, a time variation curve of the instantaneous amount of heat generated per unit volume obtained by the test welding, and when an amount of time variation of an instantaneous amount of heat generated deviates during any step from the time variation curve by a difference, performing adaptive control welding to control a current passage amount in order to compensate for the difference during a remaining welding time in the step so as to match a cumulative amount of heat generated in the actual welding to the cumulative amount of heat generated that is determined in advance in the test welding."

With the technique described in PTL 6, a nugget of a good diameter can be obtained even in the case where the electrode tips wear or a disturbance is present.

However, in the case where a large nugget diameter needs to be ensured or where the effect of a disturbance is particularly significant, such as when an existing weld is present immediately nearby or many existing welds are present around the welding point, or when the sheet gap between the steel sheets is large, excessive heat may be generated near the electrodes and cause expulsion. A satisfactory nugget diameter cannot be obtained in such a case.

It could be helpful to provide, as an improvement on the technique described in PTL 6, a resistance spot welding method that, even in the case where the effect of a disturbance is particularly significant as mentioned above, can obtain a nugget of an appropriate diameter without expulsion or an increase in welding time.

It could also be helpful to provide a weld member production method of joining a plurality of overlapping metal sheets by the resistance spot welding method.

Solution to Problem

We conducted intensive study to achieve the object stated above.

As mentioned earlier, in the case where the effect of a disturbance is significant or further the electrode tips wear, even when adaptive control welding is performed with the cumulative amount of heat generated that is obtained by the test welding being set as the target according to the technique described in PTL 6, the heat generation pattern, namely, the time variation of the temperature distribution (hereafter also referred to as "heat pattern") of the weld, may differ from the target condition (i.e. the time variation of the temperature distribution of the weld when a good weld is obtained in the test welding). This hinders the obtainment of a required nugget diameter, or causes expulsion.

We examined this point more closely, and discovered the following: Before the start of resistance spot welding and in an initial stage of welding, the resistance between the steel sheets at the welding point is high, that is, the current passage diameter has not been secured yet. Accordingly, when adaptive control welding is performed with the time variation curve of the instantaneous amount of heat generated and the cumulative amount of heat generated that are obtained by the test welding being set as the target in the case where a disturbance is present, e.g. in the case where the effect of current shunting is significant, the welding current increases considerably in a state in which the current passage diameter between the steel sheets has not been secured in the initial stage of welding. This causes marked heat generation not between the steel sheets but between the electrodes and the steel sheets, and results in a large difference in heat generation pattern from the test welding.

Besides, particularly in the case where the sheet gap between the steel sheets is large, the steel sheets warp greatly along the electrode shape. The contact area between the electrodes and the steel sheets thus increases, as compared with the case where there is no sheet gap. Hence, the current density near the electrodes decreases, and heat releasing to the electrodes is promoted. Consequently, nugget growth in the sheet thickness direction is hindered, and a thin nugget tends to form.

Further, a phenomenon that, with a decrease in the volume of a fusion zone, the specific resistance of the weld decreases and the voltage between electrodes decreases can occur. In the case of performing adaptive control welding using, as the target, the time variation curve of the instantaneous amount of heat generated and the cumulative amount of heat generated, the welding control unit recognizes such a decrease in voltage between electrodes as a decrease in the amount of heat generated. Consequently, the welding control unit rapidly increases the welding current even if actually an appropriate nugget diameter has been obtained. This causes expulsion.

In view of the above, we conducted further examination, and discovered the following: Even in the case where the effect of a disturbance is significant or further the electrode tips wear, a nugget of an appropriate diameter can be obtained without expulsion by:

performing test welding under several welding conditions, and storing, for each condition, a time variation curve of an instantaneous amount of heat generated per unit volume and a cumulative amount of heat generated per unit volume (hereafter also simply referred to as "time variation curve, etc."); and performing actual welding by performing adaptive control welding with an optimal time variation curve, etc. from among the stored time variation curves, etc. being set as a target based on a disturbance state and the like.

As a result of further conducting examination, we discovered the following:

To select the optimal time variation curve, etc. from the plurality of time variation curves, etc. based on the effect of a disturbance, it is effective to use, as a selection criterion, a parameter (hereafter also referred to as "electrode force parameter") relating to the electrode force from when electrode force application to the parts to be welded starts to when a set electrode force at the start of current passage is reached, specifically, the time and/or the electrode force change rate (increase rate) from when the electrode force application starts to when the set electrode force is reached.

Consequently, the heat pattern of the weld in the adaptive control welding can follow the heat pattern in the test welding even in the case where the effect of a disturbance is significant. A nugget of an appropriate diameter can thus be obtained without expulsion or an increase in welding time.

In real operation such as vehicle manufacturing, parts to be welded which are conveyed one after another are continuously welded. Typically, the disturbance state varies among welding positions and parts to be welded, depending on the work condition, the dimensional error of the parts to be welded, and so on.

With the foregoing welding method, by using the electrode force parameter as the selection criterion, the time variation curve, etc. are set based on the disturbance state. A desired nugget diameter can thus be stably ensured by effectively responding to variations in the disturbance state.

This is very advantageous in improving operating efficiency and yield rate in real operation.

The present disclosure is based on these discoveries and further studies.

We thus provide:

1. A resistance spot welding method of squeezing, by a pair of electrodes, parts to be welded which are a plurality of overlapping metal sheets, and passing a current while applying an electrode force to join the parts to be welded, the resistance spot welding method comprising: performing test welding; and performing actual welding after the test welding, wherein the test welding is performed under each of two or more welding conditions, in the test welding, for each of the welding conditions, an electrode force parameter from when electrode force application to the parts to be welded starts to when a set electrode force is reached is stored before start of current passage, and a time variation curve of an instantaneous amount of heat generated per unit volume and a cumulative amount of heat generated per unit volume that are calculated from an electrical property between the electrodes in forming an appropriate nugget by performing current passage by constant current control are stored, and in the actual welding: electrode force application to the parts to be welded is performed under each of the same conditions as in the test welding before start of current passage, an electrode force parameter from when the electrode force application starts to when the set electrode force is reached and the electrode force parameter stored in the test welding are compared to determine a difference therebetween for each of the welding conditions of the test welding, and a time variation curve of an instantaneous amount of heat generated per unit volume and a cumulative amount of heat generated per unit volume in the test welding that are stored for a welding condition corresponding to a smallest difference are set as a target in the actual welding; and adaptive control welding is performed to control a current passage amount according to the target.

2. The resistance spot welding method according to 1., wherein in the adaptive control welding, welding is performed with the time variation curve of the instantaneous amount of heat generated per unit volume and the cumulative amount of heat generated being set as the target, and in the case where an amount of time variation of an instantaneous amount of heat generated per unit volume differs from the time variation curve, the current passage amount is controlled in order to compensate for the difference from the time variation curve within a remaining welding time so that a cumulative amount of heat generated per unit volume in the actual welding matches the cumulative amount of heat generated per unit volume set as the target.

3. The resistance spot welding method according to 1. or 2., wherein in the test welding, at least one welding condition is that welding is performed in a simulated state of a disturbance, and an other welding condition is that welding is performed in a state of no disturbance.

4. The resistance spot welding method according to any one of 1. to 3., wherein the test welding is performed under each of three or more welding conditions.

5. The resistance spot welding method according to any one of 1. to 4., wherein in the test welding, a current pattern is divided into two or more steps in at least one welding condition, and in the actual welding, in the case where the target in the adaptive control welding is set based on data stored in the test welding for the welding condition divided into the two or more steps, a current pattern in the actual welding is divided into two or more steps as with the current pattern in the test welding and the adaptive control welding is performed for each step in the actual welding.

6. A weld member production method comprising joining a plurality of overlapping metal sheets by the resistance spot welding method according to any one of 1. to 5.

Advantageous Effect

It is thus possible to obtain a good nugget without expulsion or an increase in welding time even in the case where a large nugget diameter is needed or where the effect of a disturbance is particularly significant, such as when an existing weld is present immediately nearby or many existing welds are present around the welding point, or when the sheet gap between the metal sheets is large.

It is also possible to stably ensure a desired nugget diameter by effectively responding to variations in the disturbance state, even when continuously welding parts to be welded which are conveyed one after another in real operation such as vehicle manufacturing (even when the disturbance state varies among welding positions or parts to be welded). This is very advantageous in improving operating efficiency and yield rate.

BRIEF DESCRIPTION OF THE DRAWINGS

In the accompanying drawings:

FIG. 7 is a diagram schematically illustrating an example of a current pattern of one step in test welding; and FIG. 8 is a diagram schematically illustrating an example of a current pattern of two steps in test welding.

DETAILED DESCRIPTION

Figure 1:
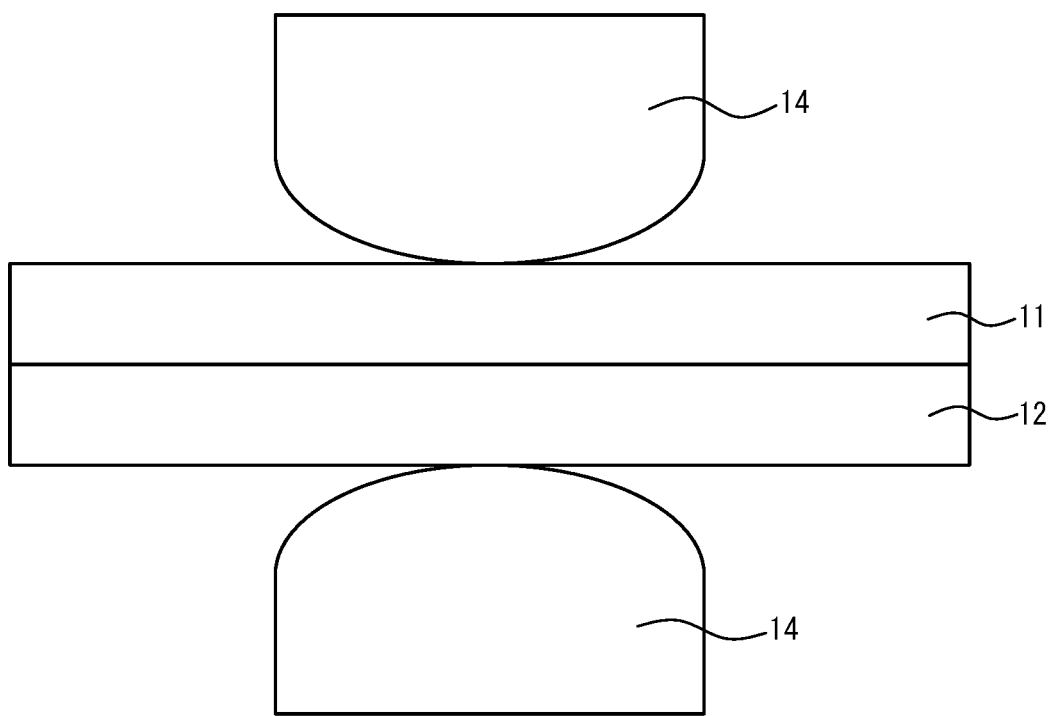
FIG. 1 is a diagram schematically illustrating an example of the case of performing welding on a sheet combination of two overlapping sheets in a state of no disturbance.

The presently disclosed techniques will be described below by way of embodiments.

One of the disclosed embodiments relates to a resistance spot welding method of squeezing, by a pair of electrodes, parts to be welded which are a plurality of overlapping metal sheets, and passing a current while applying an electrode force to join the parts to be welded, the resistance spot welding method comprising: performing test welding; and performing actual welding after the test welding, wherein the test welding is performed under each of two or more welding conditions, in the test welding, for each of the welding conditions, an electrode force parameter from when electrode force application to the parts to be welded starts to when a set electrode force is reached is stored before start of current passage, and a time variation curve of an instantaneous amount of heat generated per unit volume and a cumulative amount of heat generated per unit volume that are calculated from an electrical property between the electrodes in forming an appropriate nugget by performing current passage by constant current control are stored, and in the actual welding: electrode force application to the parts to be welded is performed under each of the same conditions as in the test welding before start of current passage, an electrode force parameter from when the electrode force application starts to when the set electrode force is reached and the electrode force parameter stored in the test welding are compared to determine a difference therebetween for each of the welding conditions of the test welding, and a time variation curve of an instantaneous amount of heat generated per unit volume and a cumulative amount of heat generated per unit volume in the test welding that are stored for a welding condition corresponding to a smallest difference are set as a target in the actual welding; and adaptive control welding is performed to control a current passage amount according to the target.

Any welding device that includes a pair of upper and lower electrodes and is capable of freely controlling each of the electrode force and the welding current during welding may be used in the resistance spot welding method according to one of the disclosed embodiments. The force mechanism (air cylinder, servomotor, etc.), the type (stationary, robot gun, etc.), the electrode shape, and the like are not limited. Herein, the "electrical property between the electrodes" means the interelectrode resistance or the voltage between electrodes.

The test welding and the actual welding in the resistance spot welding method according to one of the disclosed embodiments will be described below.

Test Welding

In the test welding, first, electrode force application to the parts to be welded is performed to a set electrode force, and, after the set electrode force is reached, current passage is performed by constant current control. Such test welding is performed under each of two or more welding conditions (i.e. disturbance states) and preferably under each of three or more welding conditions. No upper limit is placed on the number of welding conditions, but the number of welding conditions is preferably ten from the perspective of efficiency. In the test welding, an electrode force parameter from when the electrode force application to the parts to be welded starts to when the set electrode force is reached is stored before the start of current passage for each welding condition.

Figure 4:
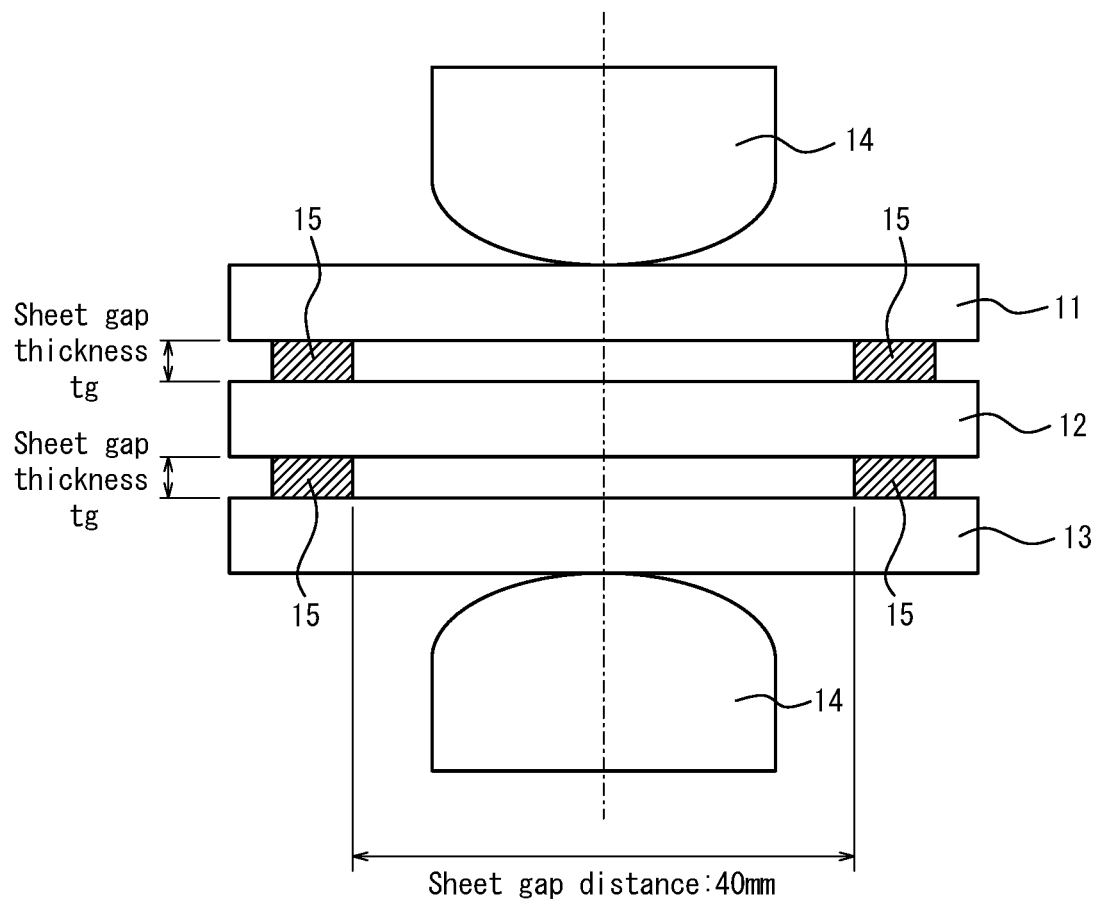
FIG. 4 is a diagram schematically illustrating an example of the case of performing welding on a sheet combination of three overlapping sheets having a sheet gap.
Figure 5:
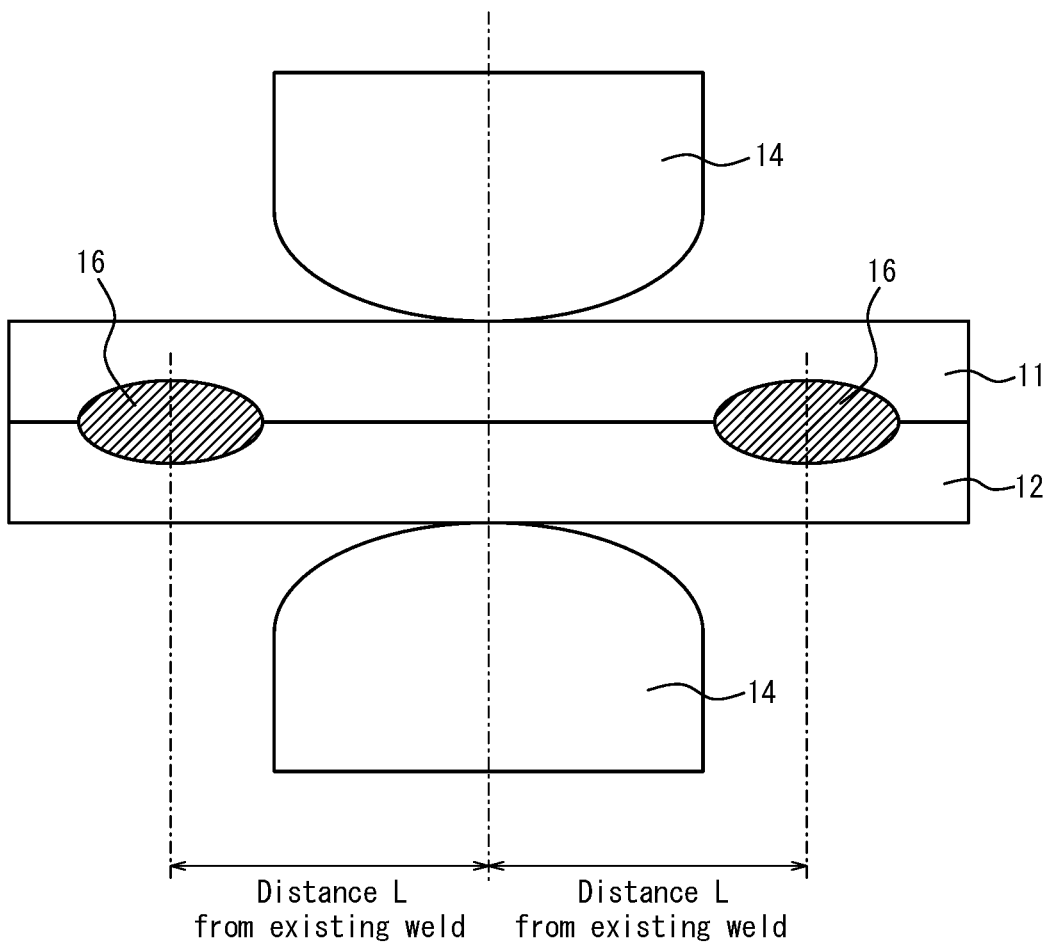
FIG. 5 is a diagram schematically illustrating an example of the case of performing welding on a sheet combination of two overlapping sheets having an existing weld.

Examples of the electrode force parameter include the time $T_F$ from when the electrode force application starts to when the set electrode force F (the set electrode force at the start of current passage) is reached and the electrode force change rate (increase rate) $\Delta F$ ($=F/T_F$) from when the electrode force application starts to when the set electrode force is reached, as illustrated in FIGS. 4 and 5.

The electrode force parameter may be set based on the torque or rotational speed of the servomotor, the strain of the electrodes or the gun, the displacement of the electrodes, etc. (hereafter also referred to as "servomotor torque, etc."). For example, the set electrode force at the start of current passage may be set based on the servomotor torque, etc., and the time from when the electrode force application starts to when the set value is reached by the servomotor torque, etc., the torque change rate or rotational speed of the servomotor from when the electrode force application starts to when the set value is reached, and the displacement rate of the electrodes from when the electrode force application starts to when the set value is reached may each be set as the electrode force parameter.

For example, the torque of the servomotor torque begins to increase rapidly when the electrodes come into contact with the metal sheets as the parts to be welded, and then reaches a stable value and is saturated when a sufficient electrode force is applied to the steel sheets. Accordingly, the time from when the torque begins to increase to when the torque is saturated may be taken to be the time from when the electrode force application starts to when the set electrode force is reached.

The rotational speed of the servomotor becomes unstable when the electrodes come into contact with the metal sheets as the parts to be welded, and then decreases gradually. When the set electrode force is reached, the electrodes stop moving, so that the rotational speed reaches 0. Accordingly, the time from when the rotational speed becomes unstable and begins to decrease to when the rotational speed reaches 0 may be taken to be the time from when the electrode force application starts to when the set electrode force is reached.

Further, for example, the time at which the torque begins to increase may be taken to be the time at which the electrode force application starts, and the time at which the rotational speed reaches 0 may be taken to be the time at which the set electrode force is reached.

Moreover, the following may each be used as the electrode force parameter:
the time from when the electrode force application starts (from the start of electrode force application) to the start of current passage,
the strain of the welding gun from when the electrode force application starts to when the set electrode force is reached, and
the displacement of the electrodes from when the electrode force application starts to when the set electrode force is reached.

For example, the time from when the electrode force application starts to the start of current passage can be expressed as "[the time from when the electrode force application starts to when the set electrode force is reached]+ [the time from when the set electrode force is reached to the start of current passage]". Hence, by comparing the parameter in the actual welding and the parameter stored in the test welding in consideration of [the time from when the set electrode force is reached to the start of current passage], the optimal one of the plurality of time variation curves of the instantaneous amounts of heat generated, etc. can be selected as the target based on the effect of a disturbance.

Thereafter, current passage is performed by constant current control, and a time variation curve of an instantaneous amount of heat generated per unit volume and a cumulative amount of heat generated per unit volume that are calculated from the electrical property between the electrodes in forming an appropriate nugget are stored.

The unit of the instantaneous amount of heat generated is not limited, and may be in conformity with the setting (e.g. J/cyc or J/ms) of the resistance spot welding device used.

The combination of the welding conditions in the test welding where data are stored is preferably made up of at least one welding condition of performing welding in a simulated state of a disturbance expected in the actual welding and a welding condition of performing welding in a state of no disturbance.

Examples of the disturbance expected in the actual welding include the above-mentioned disturbances such as current shunting and a sheet gap, e.g. an existing weld within 40 mm from the welding position (electrode center position) and a gap of 0.2 mm or more between the mating surfaces of the steel sheets as the parts to be welded.

For example, in the case where it is expected that there is a gap of 0.2 mm or more between the mating surfaces of the metal sheets as the parts to be welded and the gap varies for each welding position, preferably one welding condition in the test welding is that welding is performed in a state in which there is a gap of 0.2 mm to 3.0 mm (preferably 0.5 mm to 3.0 mm) between the mating surfaces of the metal sheets as the parts to be welded, and another welding condition is that welding is performed in a state of no disturbance. The upper limit of the gap between the mating surfaces of the metal sheets as the parts to be welded as expected is practically about 3.0 mm.

Herein, the gap between the mating surfaces of the metal sheets is the gap between the mating surfaces of the metal sheets (the distance between the mating surfaces) at the welding position before the electrode force is applied.

Particularly in the case where large variations in disturbance in the actual welding are expected, it is preferable to perform the test welding under each of three or more welding conditions each corresponding to a different disturbance state simulated.

In this case, for example, a welding condition that welding is performed in a state of no disturbance, a welding condition that there is a gap of 0.5 mm or more and less than 1.5 mm between the mating surfaces of the metal sheets as the parts to be welded, and a welding condition that there is a gap of 1.5 mm or more and less than 2.5 mm between the mating surfaces of the metal sheets as the parts to be welded may be combined.

The current pattern in the test welding may be one step. However, particularly in the case where the distance between the welding position and an existing weld is short and the effect of current shunting to the existing weld is significant, the current pattern is preferably divided into two or more steps. No upper limit is placed on the number of steps, but the number of steps is typically about five.

No limit is placed on the welding condition in each step, but the following relationship is preferably satisfied:

$0.3 \times I_x \leq I_x$ where $I_1$ is the welding current in the first step in the test welding, and $I_x$ (x: an integer of 2 to n, n: the total number of steps) is the welding current in the second step onward.

Moreover, a cooling time may be provided between the steps.

After the set electrode force is reached, preliminary current passage may be performed before the start of current passage (before the first step in the case where the current pattern is divided into two or more steps). The current pattern in the preliminary current passage is not limited, and may be a current pattern by constant current control or a current pattern of an upslope.

In the case where the preliminary current passage is performed in the test welding for a welding condition and the target of the adaptive control welding in the actual welding is set based on data stored in the test welding for the welding condition, in the actual welding, preliminary current passage is performed under the same condition as the test welding for the welding condition, or preliminary current passage is performed by adaptive control welding with the time variation curve of the instantaneous amount of heat generated and the cumulative amount of heat generated which are stored in the preliminary current passage of the test welding for the welding condition.

Test welding conditions other than the above are not limited. For example, the test welding conditions other than the above may be determined and set by performing a preliminary welding test for the same steel type and thickness as the parts to be welded, under various conditions by constant current control in each of a state of no disturbance and the foregoing simulated state of a disturbance.

Actual Welding

After the test welding, the actual welding is performed.

In the actual welding, electrode force application to the parts to be welded is performed under each of the same conditions as in the test welding before the start of current passage, an electrode force parameter from when the electrode force application starts to when the set electrode force is reached and the electrode force parameter stored in the test welding are compared to determine the difference therebetween for each of the welding conditions of the test welding, and a time variation curve of an instantaneous amount of heat generated per unit volume and a cumulative amount of heat generated per unit volume (hereafter also referred to as "time variation curve, etc.") in main current passage in the test welding that are stored for the welding condition corresponding to the smallest difference are set as the target in main current passage in the actual welding.

We consider the reason why the use of the electrode force parameter enables selecting, as the target, the optimal one of the plurality of time variation curves of the instantaneous amounts of heat generated, etc. based on the effect of a disturbance, as follows.

For example, in the case where there is a gap between the mating surfaces of the metal sheets, it is necessary to deform the metal sheets to eliminate the gap and bring the metal sheets into contact with each other at the welding position, in order to perform current passage. Here, for example, since the force applied by the upper electrode first causes the deformation of the metal sheets, the force applied by the upper electrode does not sufficiently act on the lower electrode.

Therefore, the electrode force parameter such as the time $T_F$ from when the electrode force application starts to when the set electrode force F is reached or the electrode force change rate $\Delta F$ from when the electrode force application starts to when the set electrode force is reached changes depending on the degree of a disturbance such as a gap between the mating surfaces of the metal sheets.

Thus, the use of the electrode force parameter enables selecting, as the target, the optimal time variation curve, etc. from the plurality of time variation curves, etc. based on the effect of a disturbance.

Performing electrode force application to the parts to be welded under the same condition as in the test welding means that in the actual welding, electrode force application is performed to the parts to be welded of the same condition (the same steel type and thickness) as in the test welding, with the set electrode force at the start of current passage being the same as the set electrode force at the start of current passage in the test welding.

A typical resistance spot welding device is configured to switch the control method (position control torque control) when a given electrode force (hereafter also referred to as "switching set value") between the start of electrode force application to the time at which a set electrode force is reached is reached. Generally, electrode force application using the same electrode force application means and the same switching set value can be regarded as electrode force application under the same condition (assuming that the set electrode force at the start of current passage is the same).

Then, in the actual welding, adaptive control welding is performed to control the current passage amount according to the target set as described above.

For example, in the adaptive control welding, welding is performed with the time variation curve of the instantaneous amount of heat generated per unit volume and the cumulative amount of heat generated per unit volume being set as the target. If the amount of time variation of the instantaneous amount of heat generated per unit volume follows the time variation curve, the welding is continued without change and completed. If the amount of time variation of the instantaneous amount of heat generated per unit volume differs from the time variation curve, the current passage amount is controlled in order to compensate for the difference within a remaining welding time so that the cumulative amount of heat generated per unit volume in the actual welding matches the cumulative amount of heat generated per unit volume set as the target.

The method of calculating the amount of heat generated is not limited. PTL 5 describes an example of the method, which may be used herein. The following is the procedure of calculating the amount q of heat generated per unit volume and per unit time and the cumulative amount Q of heat generated per unit volume according to this method.

Let t be the total thickness of the parts to be welded, r be the electrical resistivity of the parts to be welded, V be the voltage between electrodes, I be the welding current, and S be the contact area of the electrodes and the parts to be welded. In this case, the welding current passes through a columnar portion whose cross-sectional area is S and thickness is t, to generate heat by resistance. The amount q of heat generated per unit volume and per unit time in the columnar portion is given by the following Equation (1):

$$q=(V \cdot I)/(S \cdot t) \qquad (1).$$

The electrical resistance R of the columnar portion is given by the following Equation (2):

$$R=(r \cdot t)/S \qquad (2).$$

Solving Equation (2) for S and substituting the solution into Equation (1) yields the amount q of heat generated as indicated by the following Equation (3):

$$q=(V \cdot I \cdot R)/(r \cdot t^2)=(V^2)/(r \cdot t^2) \qquad (3).$$

As is clear from Equation (3), the amount q of heat generated per unit volume and per unit time can be calculated from the voltage between electrodes V, the total thickness t of the parts to be welded, and the electrical resistivity r of the parts to be welded, and is not affected by the contact area S of the electrodes and the parts to be welded. Although the amount of heat generated is calculated from the voltage between electrodes V in Equation (3), the amount q of heat generated may be calculated from the interelectrode current I. The contact area S of the electrodes and the parts to be welded need not be used in this case, either. By cumulating the amount q of heat generated per unit volume and per unit time for the welding time, the cumulative amount Q of heat generated per unit volume for the welding is obtained. As is clear from Equation (3), the cumulative amount Q of heat generated per unit volume can also be calculated without using the contact area S of the electrodes and the parts to be welded.

Although the above describes the case of calculating the cumulative amount Q of heat generated by the method described in PTL 5, the cumulative amount Q may be calculated by any other method.

In the case where the current pattern in the test welding is divided into two or more steps and the target of adaptive control welding is set based on the data stored in the test welding for the welding condition divided into the two or more steps as mentioned above, the current pattern in the actual welding is preferably divided into two or more steps as with the current pattern in the test welding and the adaptive control welding is preferably performed for each step in the actual welding.

In the adaptive control welding for each step, if the amount of time variation of the instantaneous amount of heat generated per unit volume in the step differs from the time variation curve, the current passage amount is controlled in order to compensate for the difference within a remaining welding time in the step so that the cumulative amount of heat generated per unit volume in the step matches the cumulative amount of heat generated per unit volume in the step in the test welding.

Particularly when the current path changes greatly between the test welding and the actual welding due to current shunting to an existing weld, with adaptive control welding of one step, the welding current may rapidly change in a short time in an attempt to achieve the target cumulative amount of heat generated.

Thus, with adaptive control welding of one step, there is a concern that, due to a failure to respond to the change of the amount of heat generated or a significant change of the heat generation pattern from the test welding, expulsion occurs or the target nugget diameter cannot be obtained.

By dividing the current pattern into two or more steps, the target cumulative amount of heat generated can be optimized for each step. Consequently, even in the case where variations in disturbance, particularly current shunting to an existing weld, are significant, the target nugget diameter can be obtained in response to the variations in disturbance.

The parts to be welded that are used are not limited. The resistance spot welding method may be used for welding of steel sheets and coated steel sheets having various strengths from mild steel to ultra high tensile strength steel and light metal sheets of aluminum alloys and the like. The resistance spot welding method may also be used for a sheet combination of three or more overlapping steel sheets.

Moreover, a subsequent current may be applied to heat-treat the weld after the current for nugget formation. The current passage condition in this case is not limited, and the magnitude relationships with the welding currents in the preceding steps are not limited. The electrode force in the current passage may be constant, or be changed as appropriate.

By joining a plurality of overlapping metal sheets by the resistance spot welding method described above, various weld members, in particular weld members of automotive parts and the like, are produced while stably ensuring a desired nugget diameter by effectively responding to variations in the disturbance state.

EXAMPLES

Test welding was performed under the conditions listed in Table 1 for each sheet combination of two or three overlapping metal sheets listed in Table 1, and then actual welding was performed under the conditions listed in Table 2 for each sheet combination of two or three overlapping metal sheets listed in Table 2, to produce a weld joint (weld member).

Figure 2:
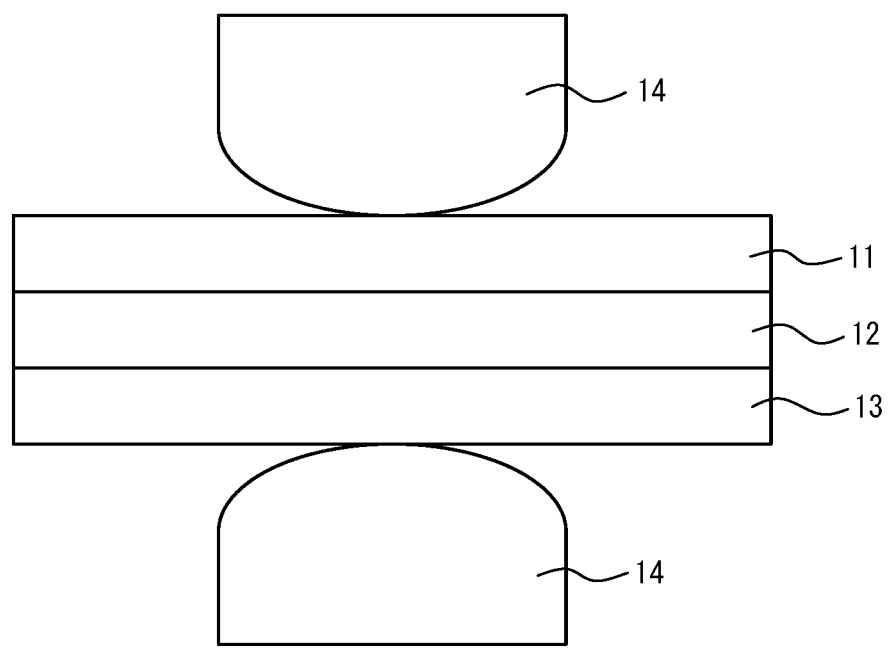
FIG. 2 is a diagram schematically illustrating an example of the case of performing welding on a sheet combination of three overlapping sheets in a state of no disturbance.
Figure 3:
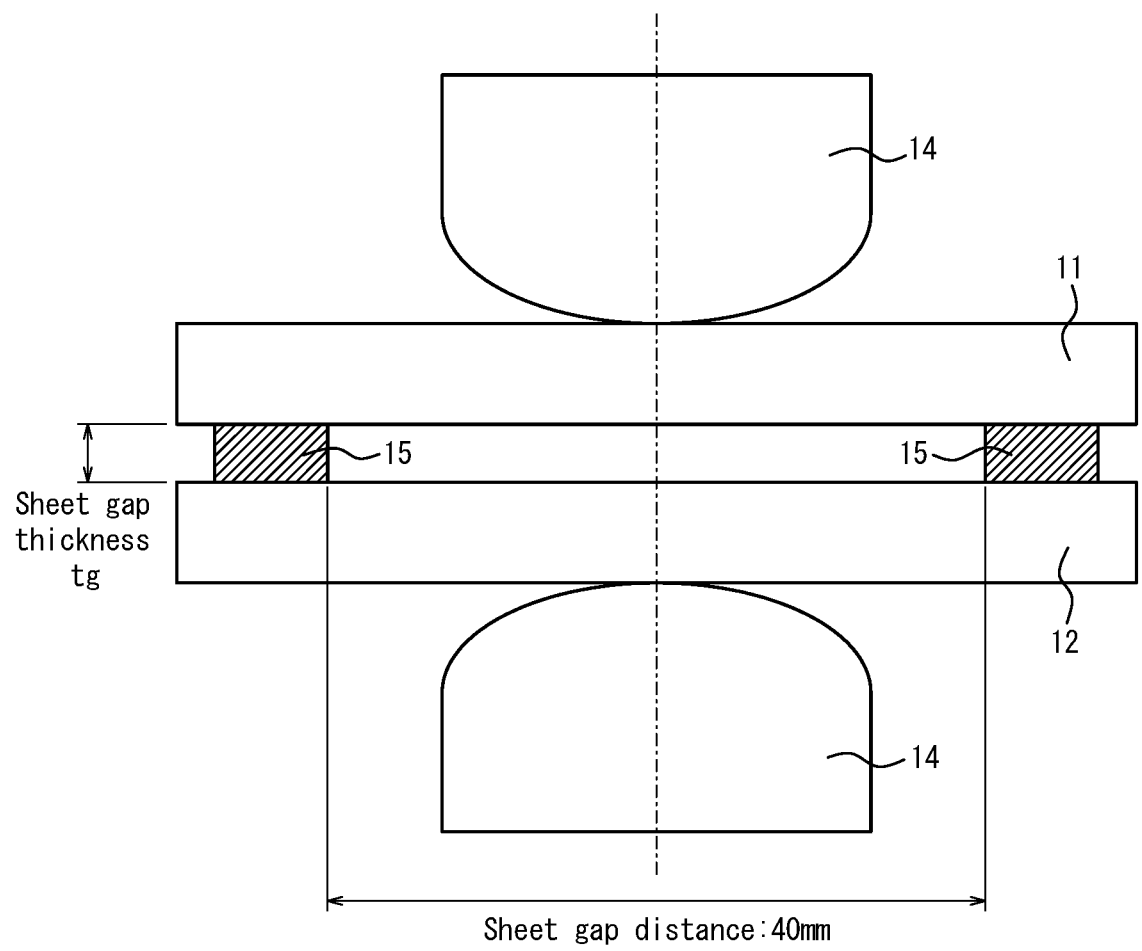
FIG. 3 is a diagram schematically illustrating an example of the case of performing welding on a sheet combination of two overlapping sheets having a sheet gap.
Figure 6:
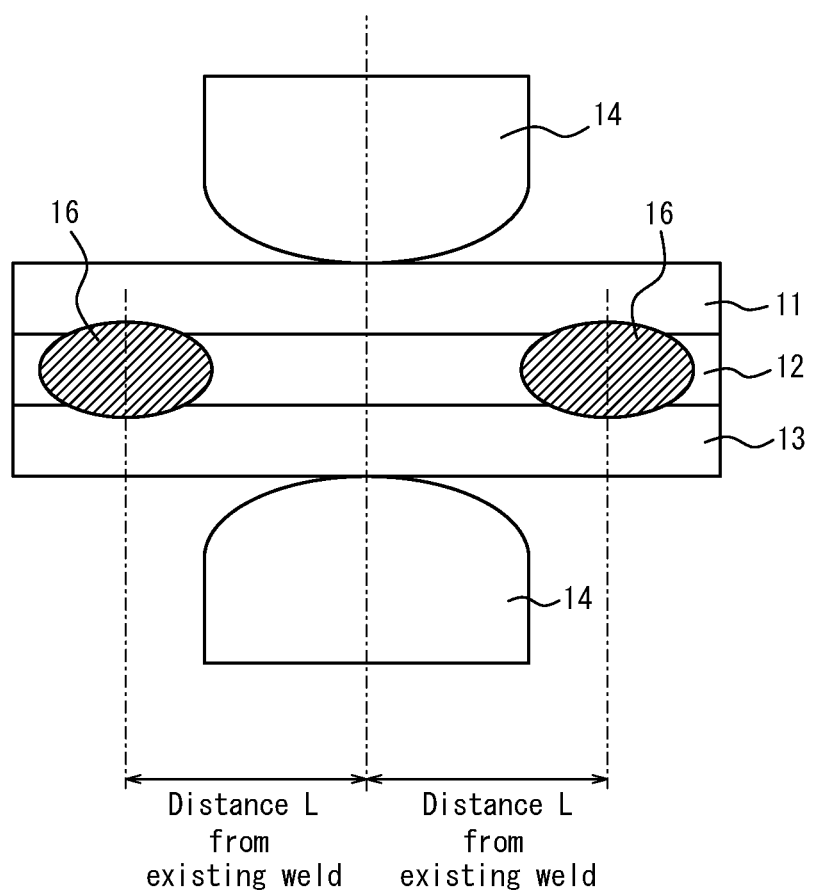
FIG. 6 is a diagram schematically illustrating an example of the case of performing welding on a sheet combination of three overlapping sheets having an existing weld.

The test welding and the actual welding were performed in a state of no disturbance as illustrated in each of FIGS. 1 and 2, and in a simulated state of a disturbance as illustrated in each of FIGS. 3 to 6. In the drawings, reference signs 11, 12, and 13 are each a metal sheet, 14 is an electrode, 15 is a spacer, and 16 is an existing weld. In FIGS. 3 and 4, spacers 15 were inserted between the metal sheets 11 and 12 and between the metal sheets 12 and 13, and the sheet combination was clamped from above and below (not illustrated), to create a sheet gap of any of various sheet gap thicknesses tg. The sheet gap distance was 40 mm in all cases. As illustrated in FIGS. 5 and 6, there were two existing welds 16, and the welding position (the center between the electrodes) was adjusted to be at a midpoint between the existing welds (i.e. the same distance L from each existing weld).

In the test welding, the time $T_F$ from when electrode force application started to when the set electrode force F was reached was stored. Moreover, current passage was performed by constant current control for each welding condition in the current pattern illustrated in FIG. 7 or 8, and the time variation curve of the instantaneous amount of heat generated per unit volume and the cumulative amount of heat generated per unit volume were stored.

In the actual welding, electrode force application to the parts to be welded was performed under each of the same conditions as in the test welding before the start of current passage, the time $T_F$ from when the electrode force application started to when the set electrode force F was reached in the actual welding and the time $T_F$ stored in the test welding were compared to determine the difference therebetween for each welding condition (compared test welding No. in Table 2), and the time variation curve of the instantaneous amount of heat generated per unit volume and the cumulative amount of heat generated per unit volume stored for the welding condition corresponding to the smallest difference were set as the target when performing adaptive control welding in the actual welding. Adaptive control welding was performed to control the current passage amount according to the target.

An inverter DC resistance spot welder was used as the welder, and chromium copper electrodes with 6 mm face diameter DR-shaped tips were used as the electrodes.

For each obtained joint, the weld was cut and etched in section, and then observed with an optical microscope. Whether the nugget diameter between the metal sheets was not less than $4.5\sqrt{t'}$ as a target diameter (t': the sheet thickness (mm) of the thinner metal sheet of adjacent two metal sheets) was determined, and evaluation was conducted according to the following criteria. For a sheet combination of three overlapping sheets, evaluation was conducted based on the nugget diameter between the thinnest outer metal sheet and the metal sheet adjacent to it.

A (pass, excellent): the target nugget diameter was ensured and no expulsion occurred under all conditions regardless of the disturbance.

B (pass, good): the target nugget diameter was ensured and no expulsion occurred under all conditions except in the case where the effect of current shunting was very significant (the distance L from an existing weld=10 mm).

C (pass): the target nugget diameter was ensured and no expulsion occurred under all conditions except in the case where the effect of a disturbance was very significant (the distance L from an existing weld=10 mm and the sheet gap thickness tg=2.0 mm).

F (fail): the target nugget diameter was not ensured and/or expulsion occurred under at least one of the following conditions: the distance L from an existing weld=20 mm; the distance L from an existing weld=40 mm; the sheet gap thickness tg=1.0 mm; the sheet gap thickness tg=0.5 mm; and no disturbance.

TABLE 1

| | Sheet combination | | | Set electrode force F (kN) | Time to reach set electrode force $T_F$ (ms) | Electrode force change rate $\Delta F$ (kN/ms) | First step | | Second step | | Disturbance state |
|---|---|---|---|---|---|---|---|---|---|---|---|
| Test welding No. | Steel sheet of reference sign 11 in the drawings | Steel sheet of reference sign 12 in the drawings | Steel sheet of reference sign 13 in the drawings | | | | Welding current I1 (kA) | Welding time T1 (ms) | Welding current I2 (KA) | Welding time T2 (ms) | |
| A | 980MPa-grade cold-rolled steel sheet (sheet thickness: 1.6 mm) | 980MPa-grade cold-rolled steel sheet (sheet thickness: 1.6 mm) | | 5.0 | 185 | 0.0270 | 7.5 | 320 | | | None |
| B | 980MPa-grade cold-rolled steel sheet (sheet thickness: 1.6 mm) | 980MPa-grade cold-rolled steel sheet (sheet thickness: 1.6 mm) | | 5.0 | 250 | 0.0200 | 7.3 | 320 | | | Sheet gap tg = 1.0 mm |
| C | 980MPa-grade cold-rolled steel sheet (sheet thickness: 1.6 mm) | 980MPa-grade cold-rolled steel sheet (sheet thickness: 1.6 mm) | | 5.0 | 285 | 0.0175 | 6.9 | 320 | | | Sheet gap tg = 2.0 mm |
| D | 980MPa-grade cold-rolled steel sheet (sheet thickness: 1.6 mm) | 980MPa-grade cold-rolled steel sheet (sheet thickness: 1.6 mm) | | 5.0 | 185 | 0.0270 | 4.0 | 140 | 7.5 | 280 | None |
| E | 980MPa-grade cold-rolled steel sheet (sheet thickness: 1.6 mm) | 980MPa-grade cold-rolled steel sheet (sheet thickness: 1.6 mm) | | 5.0 | 250 | 0.0200 | 4.0 | 140 | 7.3 | 280 | Sheet gap tg = 1.0 mm |
| F | 980MPa-grade cold-rolled steel sheet (sheet thickness: 1.6 mm) | 980MPa-grade cold-rolled steel sheet (sheet thickness: 1.6 mm) | | 5.0 | 285 | 0.0175 | 4.0 | 140 | 6.9 | 280 | Sheet gap tg = 2.0 mm |
| G | 1180MPa-grade GA steel sheet (sheet thickness: 1.6 mm) | 1180MPa-grade GA steel sheet (sheet thickness: 1.6 mm) | | 5.0 | 190 | 0.0263 | 5.0 | 120 | 8 | 240 | None |
| H | 1180MPa-grade GA steel sheet (sheet thickness: 1.6 mm) | 1180MPa-grade GA steel sheet (sheet thickness: 1.6 mm) | | 5.0 | 255 | 0.0196 | 4.5 | 140 | 7.5 | 280 | Sheet gap tg = 1.0 mm |
| I | 1180MPa-grade GA steel sheet (sheet thickness: 1.6 mm) | 1180MPa-grade GA steel sheet (sheet thickness: 1.6 mm) | | 5.0 | 295 | 0.0169 | 4.5 | 160 | 7 | 320 | Sheet gap tg = 2.0 mm |
| J | 1470MPa-grade cold-rolled steel sheet (sheet thickness: 1.6 mm) | 1470MPa-grade cold-rolled steel sheet (sheet thickness: 1.6 mm) | | 5.0 | 140 | 0.0357 | 8.0 | 320 | | | None |
| K | 1470MPa-grade cold-rolled steel sheet (sheet thickness: 1.6 mm) | 1470MPa-grade cold-rolled steel sheet (sheet thickness: 1.6 mm) | | 5.0 | 180 | 0.0278 | 9.5 | 320 | | | Sheet gap tg = 1.0 mm |
| L | 1470MPa-grade cold-rolled steel sheet (sheet thickness: 1.6 mm) | 1470MPa-grade cold-rolled steel sheet (sheet thickness: 1.6 mm) | | 5.0 | 230 | 0.0217 | 7.5 | 400 | | | Sheet gap tg = 2.0 mm |

TABLE 1-continued

| | Test welding condition | | | | | | | | | | |
|---|---|---|---|---|---|---|---|---|---|---|---|
| | Sheet combination | | | Set electrode force F (kN) | Time to reach set electrode force $T_F$ (ms) | Electrode force change rate $\Delta F$ (kN/ms) | First step | | Second step | | |
| Test welding No. | Steel sheet of reference sign 11 in the drawings | Steel sheet of reference sign 12 in the drawings | Steel sheet of reference sign 13 in the drawings | | | | Welding current I1 (kA) | Welding time T1 (ms) | Welding current I2 (KA) | Welding time T2 (ms) | Disturbance state |
| M | 270MPa-grade GA steel sheet (sheet thickness: 0.7 mm) | 980MPa-grade GA steel sheet (sheet thickness: 1.4 mm) | 980MPa-grade GA steel sheet (sheet thickness: 1.2 mm) | 5.0 | 160 | 0.0313 | 5.0 | 120 | 8.0 | 260 | None |
| N | 270MPa-grade GA steel sheet (sheet thickness: 0.7 mm) | 980MPa-grade GA steel sheet (sheet thickness: 1.4 mm) | 980MPa-grade GA steel sheet (sheet thickness: 1.2 mm) | 5.0 | 205 | 0.0244 | 5.0 | 120 | 7.8 | 260 | Sheet gap tg = 1.0 mm |
| O | 270MPa-grade GA steel sheet (sheet thickness: 0.7 mm) | 980MPa-grade GA steel sheet (sheet thickness: 1.4 mm) | 980MPa-grade GA steel sheet (sheet thickness: 1.2 mm) | 5.0 | 237 | 0.0211 | 5.0 | 120 | 7.5 | 260 | Sheet gap tg = 1.6 mm |
| P | 1470MPa-grade GA steel sheet (sheet thickness: 1.0 mm) | 1470MPa-grade GA steel sheet (sheet thickness: 1.0 mm) | | 4.0 | 151 | 0.0265 | 5.0 | 100 | 8.0 | 140 | None |
| Q | 1470MPa-grade GA steel sheet (sheet thickness: 1.0 mm) | 1470MPa-grade GA steel sheet (sheet thickness: 1.0 mm) | | 4.0 | 186 | 0.0215 | 4.5 | 100 | 8.0 | 140 | Sheet gap tg = 1.0 mm |
| R | 1470MPa-grade GA steel sheet (sheet thickness: 1.0 mm) | 1470MPa-grade GA steel sheet (sheet thickness: 1.0 mm) | | 4.0 | 224 | 0.0179 | 4.5 | 100 | 7.5 | 140 | Sheet gap tg = 1.6 mm |
| S | 1800MPa-grade Zn-Ni-coated hot stamp steel sheet (sheet thickness: 1.6 mm) | 1800MPa-grade Zn-Ni-coated hot stamp steel sheet (sheet thickness: 1.6 mm) | | 5.0 | 300 | 0.0167 | 4.0 | 120 | 6.0 | 260 | None |
| T | 1800MPa-grade Zn-Ni-coated hot stamp steel sheet (sheet thickness: 1.6 mm) | 1800MPa-grade Zn-Ni-coated hot stamp steel sheet (sheet thickness: 1.6 mm) | | 5.0 | 332 | 0.0151 | 4.0 | 120 | 5.9 | 260 | Sheet gap tg = 1.0 mm |
| U | 1800MPa-grade Zn-Ni-coated hot stamp steel sheet (sheet thickness: 1.6 mm) | 1800MPa-grade Zn-Ni-coated hot stamp steel sheet (sheet thickness: 1.6 mm) | | 5.0 | 367 | 0.0136 | 3.5 | 200 | 5.7 | 260 | Sheet gap tg = 2.0 mm |
| V | 270MPa-grade GA steel sheet (sheet thickness: 0.7 mm) | 2000MPa-grade Zn-Ni-coated hot stamp steel sheet (sheet thickness: 1.4 mm) | 1180MPa-grade GA steel sheet (sheet thickness: 1.6 mm) | 6.0 | 101 | 0.0594 | 4.5 | 180 | 6.5 | 280 | None |
| W | 270MPa-grade GA steel sheet (sheet thickness: 0.7 mm) | 2000MPa-grade Zn-Ni-coated hot stamp steel sheet (sheet thickness: 1.4 mm) | 1180MPa-grade GA steel sheet (sheet thickness: 1.6 mm) | 6.0 | 152 | 0.0395 | 4.5 | 180 | 6.4 | 280 | Sheet gap tg = 1.0 mm |

TABLE 1-continued

| | Test welding condition | | | | | | | | | |
|---|---|---|---|---|---|---|---|---|---|---|
| | Sheet combination | | | Set electrode force F (kN) | Time to reach set electrode force $T_F$ (ms) | Electrode force change rate $\Delta F$ (kN/ms) | First step | | Second step | |
| Test welding No. | Steel sheet of reference sign 11 in the drawings | Steel sheet of reference sign 12 in the drawings | Steel sheet of reference sign 13 in the drawings | | | | Welding current I1 (kA) | Welding time T1 (ms) | Welding current I2 (KA) | Welding time T2 (ms) | Disturbance state |
| X | 270MPa-grade GA steel sheet (sheet thickness: 0.7 mm) | 2000MPa-grade Zn-Ni-coated hot stamp steel sheet (sheet thickness: 1.4 mm) | 1180MPa-grade GA steel sheet (sheet thickness: 1.6 mm) | 6.0 | 188 | 0.0319 | 4.0 | 240 | 6.0 | 280 | Sheet gap tg = 1.6 mm |

TABLE 2

| No. | Joint No. | Compared test welding No. | Sheet combination | | | Set electrode force (kN) | Time to reach set electrode force $T_F$ (ms) | Electrode force change rate $\Delta F$ (kN/ms) | Disturbance state | Test welding No. followed in adaptive control welding | Nugget diameter (mm) | Expulsion | Evaluation | Remarks |
|---|---|---|---|---|---|---|---|---|---|---|---|---|---|---|
| | | | Steel sheet of reference sign 11 in the drawings | Steel sheet of reference sign 12 in the drawings | Steel sheet of reference sign 13 in the drawings | | | | | | | | | |
| 1 | 1-1 | A, B | 980MPa-grade cold-rolled steel sheet (sheet thickness: 1.6 mm) | 980MPa-grade cold-rolled steel sheet (sheet thickness: 1.6 mm) | | 5.0 | 184 | 0.0272 | None | A | 6.2 | None | C | Ex. |
| | 1-2 | | 980MPa-grade cold-rolled steel sheet (sheet thickness: 1.6 mm) | 980MPa-grade cold-rolled steel sheet (sheet thickness: 1.6 mm) | | 5.0 | 201 | 0.0249 | Sheet gap tg = 0.5 mm | A | 6.4 | None | | |
| | 1-3 | | 980MPa-grade cold-rolled steel sheet (sheet thickness: 1.6 mm) | 980MPa-grade cold-rolled steel sheet (sheet thickness: 1.6 mm) | | 5.0 | 252 | 0.0198 | Sheet gap tg = 1.0 mm | B | 6.1 | None | | |
| | 1-4 | | 980MPa-grade cold-rolled steel sheet (sheet thickness: 1.6 mm) | 980MPa-grade cold-rolled steel sheet (sheet thickness: 1.6 mm) | | 5.0 | 285 | 0.0175 | Sheet gap tg = 2.0 mm | B | 4.5 | Occurred | | |
| | 1-5 | | 980MPa-grade cold-rolled steel sheet (sheet thickness: 1.6 mm) | 980MPa-grade cold-rolled steel sheet (sheet thickness: 1.6 mm) | | 5.0 | 186 | 0.0269 | Existing weld L = 40 mm | A | 6.1 | None | | |
| | 1-6 | | 980MPa-grade cold-rolled steel sheet (sheet thickness: 1.6 mm) | 980MPa-grade cold-rolled steel sheet (sheet thickness: 1.6 mm) | | 5.0 | 187 | 0.0267 | Existing weld L = 20 mm | A | 5.9 | None | | |

TABLE 2-continued

| | | | Actual welding condition | | | | | | | | | | |
|---|---|---|---|---|---|---|---|---|---|---|---|---|---|
| | | | Sheet combination | | | | | | | Test welding No. followed | | | |
| No, | Joint No. | Compared test welding No. | Steel sheet of reference sign 11 in the drawings | Steel sheet of reference sign 12 in the drawings | Steel sheet of reference sign 13 in the drawings | Set electrode force (kN) | Time to reach set electrode force $T_F$ (ms) | Electrode force change rate $\Delta F$ (kN/ms) | Disturbance state | in adaptive control welding | Nugget diameter (mm) | Expulsion | Evaluation | Remarks |
| | 1-7 | | 980MPa-grade cold-rolled steel sheet (sheet thickness: 1.6 mm) | 980MPa-grade cold-rolled steel sheet (sheet thickness: 1.6 mm) | | 5.0 | 187 | 0.0267 | Existing weld L = 10 mm | A | 4.9 | None | | |
| 2 | 2-1 | A,B,C | 980MPa-grade cold-rolled steel sheet (sheet thickness: 1.6 mm) | 980MPa-grade cold-rolled steel sheet (sheet thickness: 1.6 mm) | | 5.0 | 184 | 0.0272 | None | A | 6.2 | None | B | Ex. |
| | 2-2 | | 980MPa-grade cold-rolled steel sheet (sheet thickness: 1.6 mm) | 980MPa-grade cold-rolled steel sheet (sheet thickness: 1.6 mm) | | 5.0 | 201 | 0.0249 | Sheet gap tg = 0.5 mm | A | 6.4 | None | | |
| | 2-3 | | 980MPa-grade cold-rolled steel sheet (sheet thickness: 1.6 mm) | 980MPa-grade cold-rolled steel sheet (sheet thickness: 1.6 mm) | | 5.0 | 252 | 0.0198 | Sheet gap tg = 1.0 mm | B | 6.1 | None | | |
| | 2-4 | | 980MPa-grade cold-rolled steel sheet (sheet thickness: 1.6 mm) | 980MPa-grade cold-rolled steel sheet (sheet thickness: 1.6 mm) | | 5.0 | 285 | 0.0175 | Sheet gap tg = 2.0 mm | C | 5.9 | None | | |
| | 2-5 | | 980MPa-grade cold-rolled steel sheet (sheet thickness: 1.6 mm) | 980MPa-grade cold-rolled steel sheet (sheet thickness: 1.6 mm) | | 5.0 | 186 | 0.0269 | Existing weld L = 40 mm | A | 6.1 | None | | |
| | 2-6 | | 980MPa-grade cold-rolled steel sheet (sheet thickness: 1.6 mm) | 980MPa-grade cold-rolled steel sheet (sheet thickness: 1.6 mm) | | 5.0 | 187 | 0.0267 | Existing weld L = 20 mm | A | 5.9 | None | | |
| | 2-7 | | 980MPa-grade cold-rolled steel sheet (sheet thickness: 1.6 mm) | 980MPa-grade cold-rolled steel sheet (sheet thickness: 1.6 mm) | | 5.0 | 187 | 0.0267 | Existing weld L = 10 mm | A | 4.9 | None | | |
| 3 | 3-1 | B,C,D | 980MPa-grade cold-rolled steel sheet (sheet thickness: 1.6 mm) | 980MPa-grade cold-rolled steel sheet (sheet thickness: 1.6 mm) | | 5.0 | 184 | 0.0272 | None | D | 6.3 | None | A | Ex. |
| | 3-2 | | 980MPa-grade cold-rolled steel sheet (sheet thickness: 1.6 mm) | 980MPa-grade cold-rolled steel sheet (sheet thickness: 1.6 mm) | | 5.0 | 201 | 0.0249 | Sheet gap tg = 0.5 mm | D | 6.3 | None | | |

TABLE 2-continued

| | | | Actual welding condition | | | | | | | | | | |
|---|---|---|---|---|---|---|---|---|---|---|---|---|---|
| | | | Sheet combination | | | | Time to reach set electrode force $T_F$ (ms) | Electrode force change rate $\Delta F$ (kN/ms) | | Test welding No. followed in adaptive control welding | | | |
| No, | Joint No. | Compared test welding No. | Steel sheet of reference sign 11 in the drawings | Steel sheet of reference sign 12 in the drawings | Steel sheet of reference sign 13 in the drawings | Set electrode force (kN) | | | Disturbance state | | Nugget diameter (mm) | Expulsion | Evaluation | Remarks |
| | 3-3 | | 980MPa-grade cold-rolled steel sheet (sheet thickness: 1.6 mm) | 980MPa-grade cold-rolled steel sheet (sheet thickness: 1.6 mm) | | 5.0 | 252 | 0.0198 | Sheet gap tg = 1.0 mm | B | 6.1 | None | | |
| | 3-4 | | 980MPa-grade cold-rolled steel sheet (sheet thickness: 1.6 mm) | 980MPa-grade cold-rolled steel sheet (sheet thickness: 1.6 mm) | | 5.0 | 285 | 0.0175 | Sheet gap tg = 2.0 mm | C | 5.9 | None | | |
| | 3-5 | | 980MPa-grade cold-rolled steel sheet (sheet thickness: 1.6 mm) | 980MPa-grade cold-rolled steel sheet (sheet thickness: 1.6 mm) | | 5.0 | 186 | 0.0269 | Existing weld L = 40 mm | D | 6.2 | None | | |
| | 3-6 | | 980MPa-grade cold-rolled steel sheet (sheet thickness: 1.6 mm) | 980MPa-grade cold-rolled steel sheet (sheet thickness: 1.6 mm) | | 5.0 | 187 | 0.0267 | L = 20 mm | D | 6.1 | None | | |
| | 3-7 | | 980MPa-grade cold-rolled steel sheet (sheet thickness: 1.6 mm) | 980MPa-grade cold-rolled steel sheet (sheet thickness: 1.6 mm) | | 5.0 | 187 | 0.0267 | Existing weld L = 10 mm | D | 6.3 | None | | |
| 4 | 4-1 | D,E,F | 980MPa-grade cold-rolled steel sheet (sheet thickness: 1.6 mm) | 980MPa-grade cold-rolled steel sheet (sheet thickness: 1.6 mm) | | 5.0 | 185 | 0.0270 | None | D | 6.3 | None | A | Ex. |
| | 4-2 | | 980MPa-grade cold-rolled steel sheet (sheet thickness: 1.6 mm) | 980MPa-grade cold-rolled steel sheet (sheet thickness: 1.6 mm) | | 5.0 | 202 | 0.0248 | Sheet gap tg = 0.5 mm | D | 6.3 | None | | |
| | 4-3 | | 980MPa-grade cold-rolled steel sheet (sheet thickness: 1.6 mm) | 980MPa-grade cold-rolled steel sheet (sheet thickness: 1.6 mm) | | 5.0 | 248 | 0.0202 | Sheet gap tg = 1.0 mm | E | 6.2 | None | | |
| | 4-4 | | 980MPa-grade cold-rolled steel sheet (sheet thickness: 1.6 mm) | 980MPa-grade cold-rolled steel sheet (sheet thickness: 1.6 mm) | | 5.0 | 290 | 0.0172 | Sheet gap tg = 2.0 mm | F | 6.3 | None | | |
| | 4-5 | | 980MPa-grade cold-rolled steel sheet (sheet thickness: 1.6 mm) | 980MPa-grade cold-rolled steel sheet (sheet thickness: 1.6 mm) | | 5.0 | 182 | 0.0275 | Existing weld L = 40 mm | D | 6.2 | None | | |

TABLE 2-continued

| | | | Sheet combination | | | Actual welding condition | | | | | | | |
|---|---|---|---|---|---|---|---|---|---|---|---|---|---|
| No, | Joint No. | Compared test welding No. | Steel sheet of reference sign 11 in the drawings | Steel sheet of reference sign 12 in the drawings | Steel sheet of reference sign 13 in the drawings | Set electrode force (kN) | Time to reach set electrode force $T_F$ (ms) | Electrode force change rate $\Delta F$ (kN/ms) | Disturbance state | Test welding No. followed in adaptive control welding | Nugget diameter (mm) | Expulsion | Evaluation | Remarks |
| | 4-6 | | 980MPa-grade cold-rolled steel sheet (sheet thickness: 1.6 mm) | 980MPa-grade cold-rolled steel sheet (sheet thickness: 1.6 mm) | | 5.0 | 187 | 0.0267 | Existing weld L = 20 mm | D | 6.1 | None | | |
| | 4-7 | | 980MPa-grade cold-rolled steel sheet (sheet thickness: 1.6 mm) | 980MPa-grade cold-rolled steel sheet (sheet thickness: 1.6 mm) | | 5.0 | 188 | 0.0266 | Existing weld L = 10 mm | D | 6.3 | None | | |
| 5 | 5-1 | A | 980MPa-grade cold-rolled steel sheet (sheet thickness: 1.6 mm) | 980MPa-grade cold-rolled steel sheet (sheet thickness: 1.6 mm) | | 5.0 | 184 | 0.0272 | None | A | 6.2 | None | F | Comp. Ex. |
| | 5-2 | | 980MPa-grade cold-rolled steel sheet (sheet thickness: 1.6 mm) | 980MPa-grade cold-rolled steel sheet (sheet thickness: 1.6 mm) | | 5.0 | 201 | 0.0249 | Sheet gap tg = 0.5 mm | A | 6.4 | None | | |
| | 5-3 | | 980MPa-grade cold-rolled steel sheet (sheet thickness: 1.6 mm) | 980MPa-grade cold-rolled steel sheet (sheet thickness: 1.6 mm) | | 5.0 | 252 | 0.0198 | Sheet gap tg = 1.0 mm | A | 4.5 | Occurred | | |
| | 5-4 | | 980MPa-grade cold-rolled steel sheet (sheet thickness: 1.6 mm) | 980MPa-grade cold-rolled steel sheet (sheet thickness: 1.6 mm) | | 5.0 | 285 | 0.0175 | Sheet gap tg = 2.0 mm | A | 4.2 | Occurred | | |
| | 5-5 | | 980MPa-grade cold-rolled steel sheet (sheet thickness: 1.6 mm) | 980MPa-grade cold-rolled steel sheet (sheet thickness: 1.6 mm) | | 5.0 | 186 | 0.0269 | Existing weld L = 40 mm | A | 6.1 | None | | |
| | 5-6 | | 980MPa-grade cold-rolled steel sheet (sheet thickness: 1.6 mm) | 980MPa-grade cold-rolled steel sheet (sheet thickness: 1.6 mm) | | 5.0 | 187 | 0.0267 | Existing weld L = 20 mm | A | 5.9 | None | | |
| | 5-7 | | 980MPa-grade cold-rolled steel sheet (sheet thickness: 1.6 mm) | 980MPa-grade cold-rolled steel sheet (sheet thickness: 1.6 mm) | | 5.0 | 187 | 0.0267 | Existing weld L = 10 mm | A | 4.9 | None | | |
| 6 | 6-1 | G,H,I | 1180MPa-grade GA steel sheet (sheet thickness: 1.6 mm) | 1180a-grade GA steel sheet (sheet thickness: 1.6 mm) | | 5.0 | 190 | 0.0263 | None | G | 6.1 | None | A | Ex. |

TABLE 2-continued

| No, | Joint No. | Compared test welding No. | Sheet combination | | | Set electrode force (kN) | Time to reach set electrode force $T_F$ (ms) | Electrode force change rate $\Delta F$ (kN/ms) | Disturbance state | Test welding No. followed in adaptive control welding | Nugget diameter (mm) | Expulsion | Evaluation | Remarks |
|---|---|---|---|---|---|---|---|---|---|---|---|---|---|---|
| | | | Steel sheet of reference sign 11 in the drawings | Steel sheet of reference sign 12 in the drawings | Steel sheet of reference sign 13 in the drawings | | | | | | | | | |
| | 6-2 | | 1180MPa-grade GA steel sheet (sheet thickness: 1.6 mm) | 1180MPa-grade GA steel sheet (sheet thickness: 1.6 mm) | | 5.0 | 205 | 0.0244 | Sheet gap tg = 0.5 mm | G | 6.2 | None | | |
| | 6-3 | | 1180MPa-grade GA steel sheet (sheet thickness: 1.6 mm) | 1180MPa-grade GA steel sheet (sheet thickness: 1.6 mm) | | 5.0 | 252 | 0.0198 | Sheet gap tg = 1.0 mm | H | 6.2 | None | | |
| | 6-4 | | 1180MPa-grade GA steel sheet (sheet thickness: 1.6 mm) | 1180MPa-grade GA steel sheet (sheet thickness: 1.6 mm) | | 5.0 | 294 | 0.0170 | Sheet gap tg = 2.0 mm | I | 6.0 | None | | |
| | 6-5 | | 1180MPa-grade GA steel sheet (sheet thickness: 1.6 mm) | 1180MPa-grade GA steel sheet (sheet thickness: 1.6 mm) | | 5.0 | 191 | 0.0262 | Existing weld L = 40 mm | G | 5.9 | None | | |
| | 6-6 | | 1180MPa-grade GA steel sheet (sheet thickness: 1.6 mm) | 1180MPa-grade GA steel sheet (sheet thickness: 1.6 mm) | | 5.0 | 190 | 0.0263 | Existing weld L = 20 mm | G | 5.9 | None | | |
| | 6-7 | | 1180MPa-grade GA steel sheet (sheet thickness: 1.6 mm) | 1180MPa-grade GA steel sheet (sheet thickness: 1.6 mm) | | 5.0 | 188 | 0.0266 | Existing weld L = 10 mm | G | 6.3 | None | | |
| 7 | 7-1 | J,K,L | 1470MPa-grade cold-rolled steel sheet (sheet thickness: 1.6 mm) | 1470MPa-grade cold-rolled steel sheet (sheet thickness: 1.6 mm) | | 5.0 | 141 | 0.0355 | None | J | 6.2 | None | B | Ex. |
| | 7-2 | | 1470MPa-grade cold-rolled steel sheet (sheet thickness: 1.6 mm) | 1470MPa-grade cold-rolled steel sheet (sheet thickness: 1.6 mm) | | 5.0 | 151 | 0.0331 | Sheet gap tg = 0.5 mm | J | 6.3 | None | | |
| | 7-3 | | 1470MPa-grade cold-rolled steel sheet (sheet thickness: 1.6 mm) | 1470MPa-grade cold-rolled steel sheet (sheet thickness: 1.6 mm) | | 5.0 | 178 | 0.0281 | Sheet gap tg = 1.0 mm | K | 6.0 | None | | |
| | 7-4 | | 1470MPa-grade cold-rolled steel sheet (sheet thickness: 1.6 mm) | 1470MPa-grade cold-rolled steel sheet (sheet thickness: 1.6 mm) | | 5.0 | 230 | 0.0217 | Sheet gap tg = 2.0 mm | L | 5.9 | None | | |

TABLE 2-continued

| | | | Actual welding condition | | | | | | | | | | |
|---|---|---|---|---|---|---|---|---|---|---|---|---|---|
| | | | Sheet combination | | | | | | | | | | |
| No, | Joint No. | Compared test welding No. | Steel sheet of reference sign 11 in the drawings | Steel sheet of reference sign 12 in the drawings | Steel sheet of reference sign 13 in the drawings | Set electrode force (kN) | Time to reach set electrode force $T_F$ (ms) | Electrode force change rate $\Delta F$ (kN/ms) | Disturbance state | Test welding No. followed in adaptive control welding | Nugget diameter (mm) | Expulsion | Evaluation | Remarks |
| | 7-5 | | 1470MPa-grade cold-rolled steel sheet (sheet thickness: 1.6 mm) | 1470MPa-grade cold-rolled steel sheet (sheet thickness: 1.6 mm) | | 5.0 | 140 | 0.0357 | Existing weld L = 40 mm | J | 5.9 | None | | |
| | 7-6 | | 1470MPa-grade cold-rolled steel sheet (sheet thickness: 1.6 mm) | 1470MPa-grade cold-rolled steel sheet (sheet thickness: 1.6 mm) | | 5.0 | 140 | 0.0357 | Existing weld L = 20 mm | J | 5.8 | None | | |
| | 7-7 | | 1470MPa-grade cold-rolled steel sheet (sheet thickness: 1.6 mm) | 1470MPa-grade cold-rolled steel sheet (sheet thickness: 1.6 mm) | | 5.0 | 139 | 0.0360 | Existing weld L = 10 mm | J | 4.7 | None | | |
| 8 | 8-1 | M,N,O | 270MPa-grade GA steel sheet (sheet thickness: 0.7 mm) | 980MPa-grade GA steel sheet (sheet thickness: 1.4 mm) | 980MPa-grade GA steel sheet (sheet thickness: 1.2 mm) | 5.0 | 164 | 0.0305 | None | M | 4.0 | None | A | Ex. |
| | 8-2 | | 270MPa-grade GA steel sheet (sheet thickness: 0.7 mm) | 980MPa-grade GA steel sheet (sheet thickness: 1.4 mm) | 980MPa-grade GA steel sheet (sheet thickness: 1.2 mm) | 5.0 | 179 | 0.0279 | Sheet gap tg = 0.5 mm | M | 4.2 | None | | |
| | 8-3 | | 270MPa-grade GA steel sheet (sheet thickness: 0.7 mm) | 980MPa-grade GA steel sheet (sheet thickness: 1.4 mm) | 980MPa-grade GA steel sheet (sheet thickness: 1.2 mm) | 5.0 | 210 | 0.0238 | Sheet gap tg = 1.0 mm | N | 4.1 | None | | |
| | 8-4 | | 270MPa-grade GA steel sheet (sheet thickness: 0.7 mm) | 980MPa-grade GA steel sheet (sheet thickness: 1.4 mm) | 980MPa-grade GA steel sheet (sheet thickness: 1.2 mm) | 5.0 | 237 | 0.0211 | Sheetgap tg = 1.6 mm | O | 4.0 | None | | |
| | 8-5 | | 270MPa-grade GA steel sheet (sheet thickness: 0.7 mm) | 980MPa-grade GA steel sheet (sheet thickness: 1.4 mm) | 980MPa-grade GA steel sheet (sheet thickness: 1.2 mm) | 5.0 | 162 | 0.0309 | Existing weld L = 40 mm | M | 4.1 | None | | |
| | 8-6 | | 270MPa-grade GA steel sheet (sheet thickness: 0.7 mm) | 980MPa-grade GA steel sheet (sheet thickness: 1.4 mm) | 980MPa-grade GA steel sheet (sheet thickness: 1.2 mm) | 5.0 | 161 | 0.0311 | Existing weld L = 20 mm | M | 4.3 | None | | |
| | 8-7 | | 270MPa-grade GA steel sheet (sheet thickness: 0.7 mm) | 980MPa-grade GA steel sheet (sheet thickness: 1.4 mm) | 980MPa-grade GA steel sheet (sheet thickness: 1.2 mm) | 5.0 | 162 | 0.0309 | Existing weld L = 10 mm | M | 4.4 | None | | |

TABLE 2-continued

| | | | Actual welding condition | | | | | | | | | | |
|---|---|---|---|---|---|---|---|---|---|---|---|---|---|
| | | | Sheet combination | | | | Time to reach set electrode force $T_F$ (ms) | Electrode force change rate $\Delta F$ (kN/ms) | | Test welding No. followed in adaptive control welding | | | |
| No, | Joint No. | Compared test welding No. | Steel sheet of reference sign 11 in the drawings | Steel sheet of reference sign 12 in the drawings | Steel sheet of reference sign 13 in the drawings | Set electrode force (kN) | | | Disturbance state | | Nugget diameter (mm) | Expulsion | Evaluation | Remarks |
| 9 | 9-1 | P,Q,R | 1470MPa-grade GA steel sheet (sheet thickness: 1.0 mm) | 1470MPa-grade GA steel sheet (sheet thickness: 1.0 mm) | | 4.0 | 150 | 0.0267 | None | P | 5.1 | None | A | Ex. |
| | 9-2 | | 1470MPa-grade GA steel sheet (sheet thickness: 1.0 mm) | 1470MPa-grade GA steel sheet (sheet thickness: 1.0 mm) | | 4.0 | 160 | 0.0250 | Sheet gap tg = 0.5 mm | P | 5.0 | None | | |
| | 9-3 | | 1470MPa-grade GA steel sheet (sheet thickness: 1.0 mm) | 1470MPa-grade GA steel sheet (sheet thickness: 1.0 mm) | | 4.0 | 186 | 0.0215 | Sheet gap tg = 1.0 mm | Q | 5.1 | None | | |
| | 9-4 | | 1470MPa-grade GA steel sheet (sheet thickness: 1.0 mm) | 1470MPa-grade GA steel sheet (sheet thickness: 1.0 mm) | | 4.0 | 222 | 0.0180 | Sheet gap tg = 1.6 mm | R | 5.4 | None | | |
| | 9-5 | | 1470MPa-grade GA steel sheet (sheet thickness: 1.0 mm) | 1470MPa-grade GA steel sheet (sheet thickness: 1.0 mm) | | 4.0 | 148 | 0.0270 | Existing weld L = 40 mm | P | 5.0 | None | | |
| | 9-6 | | 1470MPa-grade GA steel sheet (sheet thickness: 1.0 mm) | 1470MPa-grade GA steel sheet (sheet thickness: 1.0 mm) | | 4.0 | 147 | 0.0272 | Existing weld L = 20 mm | P | 4.8 | None | | |
| | 9-7 | | 1470MPa-grade GA steel sheet (sheet thickness: 1.0 mm) | 1470MPa-grade GA steel sheet (sheet thickness: 1.0 mm) | | 4.0 | 149 | 0.0268 | Existing weld L = 10 mm | P | 5.2 | None | | |
| 10 | 10-1 | S,T,U | 1800MPa-grade Zn-Ni-coated hot stamp steel sheet (sheet thickness: 1.6 mm) | 1800MPa-grade Zn-Ni-coated hot stamp steel sheet (sheet thickness: 1.6 mm) | | 5.0 | 305 | 0.0164 | None | S | 6.2 | None | A | Ex. |
| | 10-2 | | 1800MPa-grade Zn-Ni-coated hot stamp steel sheet (sheet thickness: 1.6 mm) | 1800MPa-grade Zn-Ni-coated hot stamp steel sheet (sheet thickness: 1.6 mm) | | 5.0 | 312 | 0.0160 | Sheet gap tg = 0.5 mm | S | 6.4 | None | | |
| | 10-3 | | 1800MPa-grade Zn-Ni-coated hot stamp steel sheet (sheet thickness: 1.6 mm) | 1800MPa-grade Zn-Ni-coated hot stamp steel sheet (sheet thickness: 1.6 mm) | | 5.0 | 333 | 0.0150 | Sheet gap tg = 1.0 mm | T | 5.9 | None | | |

TABLE 2-continued

| No, | Joint No. | Compared test welding No. | Sheet combination Steel sheet of reference sign 11 in the drawings | Steel sheet of reference sign 12 in the drawings | Steel sheet of reference sign 13 in the drawings | Set electrode force (kN) | Time to reach set electrode force $T_F$ (ms) | Electrode force change rate $\Delta F$ (kN/ms) | Disturbance state | Test welding No. followed in adaptive control welding | Nugget diameter (mm) | Expulsion | Evaluation | Remarks |
|---|---|---|---|---|---|---|---|---|---|---|---|---|---|---|
| | 10-4 | | 1800MPa-grade Zn-Ni-coated hot stamp steel sheet (sheet thickness: 1.6 mm) | 1800MPa-grade Zn-Ni-coated hot stamp steel sheet (sheet thickness: 1.6 mm) | | 5.0 | 370 | 0.0135 | Sheet gap tg = 2.0 mm | U | 5.8 | None | | |
| | 10-5 | | 1800MPa-grade Zn-Ni-coated hot stamp steel sheet (sheet thickness: 1.6 mm) | 1800MPa-grade Zn-Ni-coated hot stamp steel sheet (sheet thickness: 1.6 mm) | | 5.0 | 299 | 0.0167 | Existing weld L = 40 mm | S | 6.2 | None | | |
| | 10-6 | | 1800MPa-grade Zn-Ni-coated hot stamp steel sheet (sheet thickness: 1.6 mm) | 1800MPa-grade Zn-Ni-coated hot stamp steel sheet (sheet thickness: 1.6 mm) | | 5.0 | 302 | 0.0166 | Existing weld L = 20 mm | S | 6.1 | None | | |
| | 10-7 | | 1800MPa-grade Zn-Ni-coated hot stamp steel sheet (sheet thickness: 1.6 mm) | 1800MPa-grade Zn-Ni-coated hot stamp steel sheet (sheet thickness: 1.6 mm) | | 5.0 | 305 | 0.0164 | Existing weld L = 10 mm | S | 6.4 | None | | |
| 11 | 11-1 | V,W,X | 270MPa-grade GA steel sheet (sheet thickness 0.7 mm) | 2000MPa-grade Zn-Ni-coated hot stamp steel sheet (sheet thickness: 1.4 mm) | 1180MPa-grade GA steel sheet (sheet thickness 1.6 mm) | 6.0 | 102 | 0.0588 | None | V | 4.2 | None | A | Ex. |
| | 11-2 | | 270MPa-grade GA steel sheet (sheet thickness 0.7 mm) | 2000MPa-grade Zn-Ni-coated hot stamp steel sheet (sheet thickness: 1.4 mm) | 1180MPa-grade GA steel sheet (sheet thickness 1.6 mm) | 6.0 | 120 | 0.0500 | Sheet gap tg = 0.5 mm | V | 4.3 | None | | |
| | 11-3 | | 270MPa-grade GA steel sheet (sheet thickness 0.7 mm) | 2000MPa-grade Zn-Ni-coated hot stamp steel sheet (sheet thickness: 1.4 mm) | 1180MPa-grade GA steel sheet (sheet thickness 1.6 mm) | 6.0 | 152 | 0.0395 | Sheet gap tg = 1.0 mm | W | 4.2 | None | | |
| | 11-4 | | 270MPa-grade GA steel sheet (sheet thickness 0.7 mm) | 2000MPa-grade Zn-Ni-coated hot stamp steel sheet (sheet thickness: 1.4 mm) | 1180MPa-grade GA steel sheet (sheet thickness 1.6 mm) | 6.0 | 190 | 0.0316 | Sheet gap tg = 1.6 mm | X | 4.0 | None | | |
| | 11-5 | | 270MPa-grade GA steel sheet (sheet thickness: 0.7 mm) | 2000MPa-grade Zn-Ni-coated hot stamp steel sheet (sheet thickness: 1.4 mm) | 1180MPa-grade GA steel sheet (sheet thickness: 1.6 mm) | 6.0 | 101 | 0.0594 | Existing weld L = 40 mm | V | 4.4 | None | | |

TABLE 2-continued

| No, | Joint No. | Compared test welding No. | Steel sheet of reference sign 11 in the drawings | Steel sheet of reference sign 12 in the drawings | Steel sheet of reference sign 13 in the drawings | Set electrode force (kN) | Time to reach set electrode force $T_F$ (ms) | Electrode force change rate $\Delta F$ (kN/ms) | Disturbance state | Test welding No. followed in adaptive control welding | Nugget diameter (mm) | Expulsion | Evaluation | Remarks |
|---|---|---|---|---|---|---|---|---|---|---|---|---|---|---|
| | 11-6 | | 270MPa-grade GA steel sheet (sheet thickness: 0.7 mm) | 2000MPa-grade Zn-Ni-coated hot stamp steel sheet (sheet thickness: 1.4 mm) | 1180MPa-grade GA steel sheet (sheet thickness: 1.6 mm) | 6.0 | 100 | 0.0600 | Existing weld L = 20 mm | V | 4.3 | None | | |
| | 11-7 | | 270MPa-grade GA steel sheet (sheet thickness: 0.7 mm) | 2000MPa-grade Zn-Ni-coated hot stamp steel sheet (sheet thickness: 1.4 mm) | 1180MPa-grade GA steel sheet (sheet thickness: 1.6 mm) | 6.0 | 105 | 0.0571 | Existing weld L = 10 mm | V | 4.5 | None | | |

In all Examples (Ex.), the target nugget diameter was obtained with no expulsion as a result of effectively responding to most of variations in disturbance. Particularly in Nos. 3, 4, 6, and 8 to 11, the target nugget diameter was obtained with no expulsion as a result of effectively responding to variations in disturbance, regardless of the type or degree of disturbance.

In Comparative Examples (Comp. Ex.), expulsion occurred or a nugget with a sufficient diameter was not formed in the case where the effect of a disturbance was particularly significant, without effectively responding to variations in disturbance.

The same results as above were obtained in the case where the electrode force change rate ΔF from when the electrode force application started to when the set electrode force was reached was stored in the test welding and the target of the time variation curve of the instantaneous amount of heat generated and the cumulative amount of heat generated when performing adaptive control welding in the actual welding was set using ΔF.

REFERENCE SIGNS LIST

11, 12 metal sheet
14 electrode
15 spacer
16 existing weld

The invention claimed is:

1. A resistance spot welding method of squeezing, by a pair of electrodes, parts to be welded which are a plurality of overlapping metal sheets, and passing a current while applying an electrode force to join the parts to be welded, the resistance spot welding method comprising:
  performing test welding; and
  performing actual welding after the test welding,
  wherein the test welding is performed under each of two or more welding conditions,
  in the test welding, for each of the welding conditions, a parameter relating to the electrode force from when electrode force application to the parts to be welded starts to when the electrode force reaches a preset value is stored before start of current passage, and a time variation curve of an instantaneous amount of heat generated per unit volume and a cumulative amount of heat generated per unit volume that are calculated from an electrical property between the electrodes in forming a nugget having a diameter within a predetermined range by performing current passage by constant current control are stored, and
  in the actual welding, electrode force application to the parts to be welded is performed under each of the same conditions as in the test welding before start of current passage, the parameter relating to the electrode force from when the electrode force application starts to when the electrode force reaches a preset value and the parameter relating to the electrode force stored in the test welding are compared to determine a difference therebetween for each of the welding conditions of the test welding, and the time variation curve of the instantaneous amount of heat generated per unit volume and the cumulative amount of heat generated per unit volume in the test welding that are stored for the welding condition corresponding to a smallest difference are set as a target in the actual welding; and
  the actual welding is performed by adaptive control welding to control a current passage amount according to the target; and
  in the test welding, at least one of the welding conditions is that welding is performed in a simulated state of a disturbance, and at least another one of the welding conditions is that welding is performed in a state of no disturbance.

2. The resistance spot welding method according to claim 1, wherein in the adaptive control welding, welding is performed with the time variation curve of the instantaneous amount of heat generated per unit volume and the cumulative amount of heat generated being set as the target, and in the case where an amount of time variation of an instantaneous amount of heat generated per unit volume differs from the time variation curve, the current passage amount is controlled in order to compensate for the difference from the time variation curve within a remaining welding time so that a cumulative amount of heat generated per unit volume in the actual welding matches the cumulative amount of heat generated per unit volume set as the target.

3. The resistance spot welding method according to claim 1, wherein the test welding is performed under each of three or more welding conditions.

4. The resistance spot welding method according to claim 1, wherein in the test welding, a current pattern is divided into two or more steps in at least one welding condition, and
in the actual welding, in the case where the target in the adaptive control welding is set based on data stored in the test welding for the welding condition divided into the two or more steps, a current pattern in the actual welding is divided into two or more steps as with the current pattern in the test welding and the adaptive control welding is performed for each step in the actual welding.

5. A weld member production method comprising
joining a plurality of overlapping metal sheets by the resistance spot welding method according to claim 1.

6. The resistance spot welding method according to claim 2, wherein the test welding is performed under each of three or more welding conditions.

7. The resistance spot welding method according to claim 2, wherein in the test welding, a current pattern is divided into two or more steps in at least one welding condition, and
in the actual welding, in the case where the target in the adaptive control welding is set based on data stored in the test welding for the welding condition divided into the two or more steps, a current pattern in the actual welding is divided into two or more steps as with the current pattern in the test welding and the adaptive control welding is performed for each step in the actual welding.

8. The resistance spot welding method according to claim 3, wherein in the test welding, a current pattern is divided into two or more steps in at least one welding condition, and
in the actual welding, in the case where the target in the adaptive control welding is set based on data stored in the test welding for the welding condition divided into the two or more steps, a current pattern in the actual welding is divided into two or more steps as with the current pattern in the test welding and the adaptive control welding is performed for each step in the actual welding.

9. The resistance spot welding method according to claim 6, wherein in the test welding, a current pattern is divided into two or more steps in at least one welding condition, and
in the actual welding, in the case where the target in the adaptive control welding is set based on data stored in the test welding for the welding condition divided into the two or more steps, a current pattern in the actual welding is divided into two or more steps as with the current pattern in the test welding and the adaptive control welding is performed for each step in the actual welding.

10. A weld member production method comprising
joining a plurality of overlapping metal sheets by the resistance spot welding method according to claim 2.

11. A weld member production method comprising
joining a plurality of overlapping metal sheets by the resistance spot welding method according to claim 3.

* * * * *